(12) United States Patent
Leitner et al.

(10) Patent No.: US 6,824,184 B2
(45) Date of Patent: Nov. 30, 2004

(54) VEHICLE BED STORAGE BOX

(75) Inventors: Horst Leitner, Laguna Beach, CA (US); Jonathan E. Weisel, Norco, CA (US)

(73) Assignee: American Moto Products, Inc., Irvine, CA (US)

(*) Notice: Subject to any disclaimer, the term of this patent is extended or adjusted under 35 U.S.C. 154(b) by 0 days.

(21) Appl. No.: 10/705,808

(22) Filed: Nov. 10, 2003

(65) Prior Publication Data

US 2004/0169389 A1 Sep. 2, 2004

Related U.S. Application Data

(63) Continuation of application No. 10/282,954, filed on Oct. 28, 2002, now Pat. No. 6,644,711, which is a continuation of application No. 09/846,577, filed on May 1, 2001, now Pat. No. 6,471,278, which is a continuation of application No. 09/488,207, filed on Jan. 19, 2000, now Pat. No. 6,257,278

(60) Provisional application No. 60/117,098, filed on Jan. 25, 1999.

(51) Int. Cl.[7] ................................................. B60N 3/12
(52) U.S. Cl. ...................... 296/37.6; 296/37.5; 224/404
(58) Field of Search ............................... 296/37.6, 37.5, 296/57.1, 180.1; 224/404, 402, 403, 543

(56) References Cited

U.S. PATENT DOCUMENTS

| | | |
|---|---|---|
| 1,764,615 A | 6/1930 | Edwards |
| 4,451,075 A | 5/1984 | Canfield |
| 4,635,992 A | 1/1987 | Hamilton et al. |
| 4,749,226 A | 6/1988 | Heft |
| 4,750,773 A | 6/1988 | Chapline et al. |
| 4,789,195 A | 12/1988 | Fletcher |
| 4,828,312 A | 5/1989 | Kinkel et al. |
| 5,037,153 A | 8/1991 | Stark |
| 5,169,200 A | 12/1992 | Pugh |
| 5,201,561 A | 4/1993 | Brown |
| 5,722,714 A | 3/1998 | Vallerand |
| 5,736,567 A | 4/1998 | Cantin et al. |
| 5,743,589 A | 4/1998 | Felker |
| 5,853,116 A | 12/1998 | Schreiner |
| 5,961,173 A | 10/1999 | Repetti |
| 6,257,640 B1 | 7/2001 | Leitner et al. |
| 6,305,730 B1 | 10/2001 | Stone |
| 6,471,278 B2 | 10/2002 | Leitner et al. |
| 6,543,829 B2 | 4/2003 | Brown |
| 6,644,711 B2 | 11/2003 | Leitner et al. |

*Primary Examiner*—Joseph D. Pape
(74) *Attorney, Agent, or Firm*—Knobbe Martens Olson & Bear LLP

(57) ABSTRACT

A collapsible storage device includes a first panel and a second panel, with one end of the first panel rotatably secured to one wall of a vehicle bed. One end of the second panel is rotatably secured to the opposite end of the first panel. The device has a deployed or storage position in which the first panel is generally horizontal and the second panel is generally vertical so that the two panels, in cooperation with the existing walls of the bed, form an enclosed container. The device also has a folded position in which the second panel is folded against the first panel, and the first panel together with the second is folded against a wall of the vehicle bed. The collapsible storage device has means for locking the device in the deployed and/or the folded position. Alternatively, the device may have means for locking the two panels together during deployment and/or retraction, or the device may be interposed between two storage bins along a wall of the vehicle bed. A track or tracks may be provided on one or both sides of the storage device to coact with a track follower on one or both sides of the second panel to provide easier collapse or deployment of the device.

25 Claims, 21 Drawing Sheets

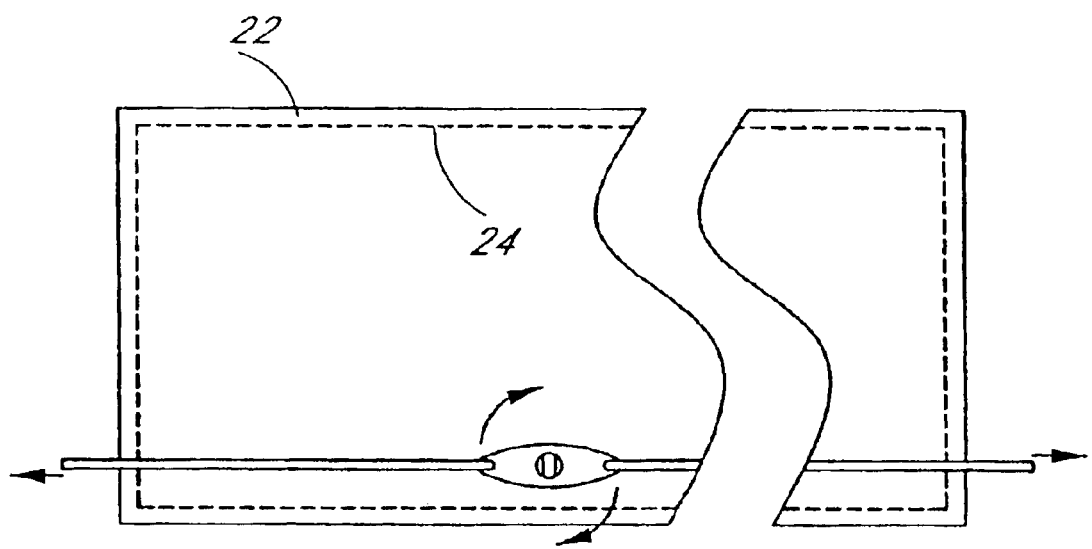
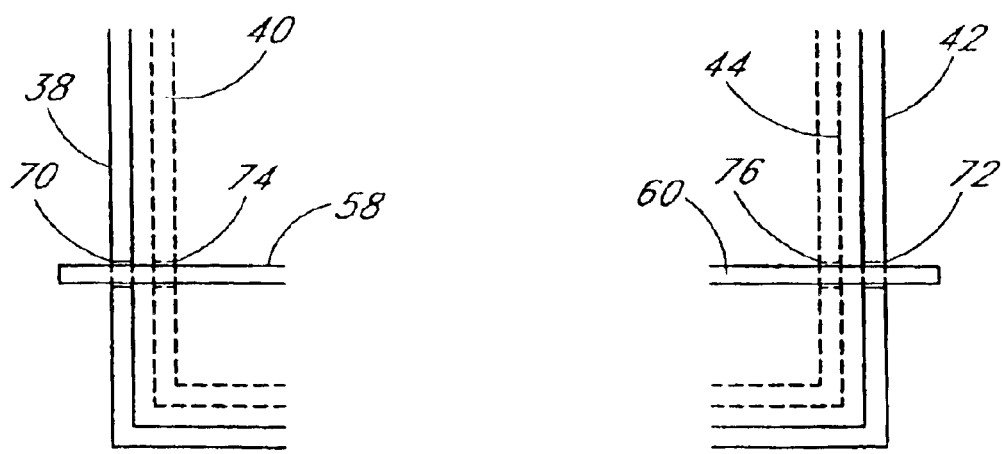
FIG. 4C

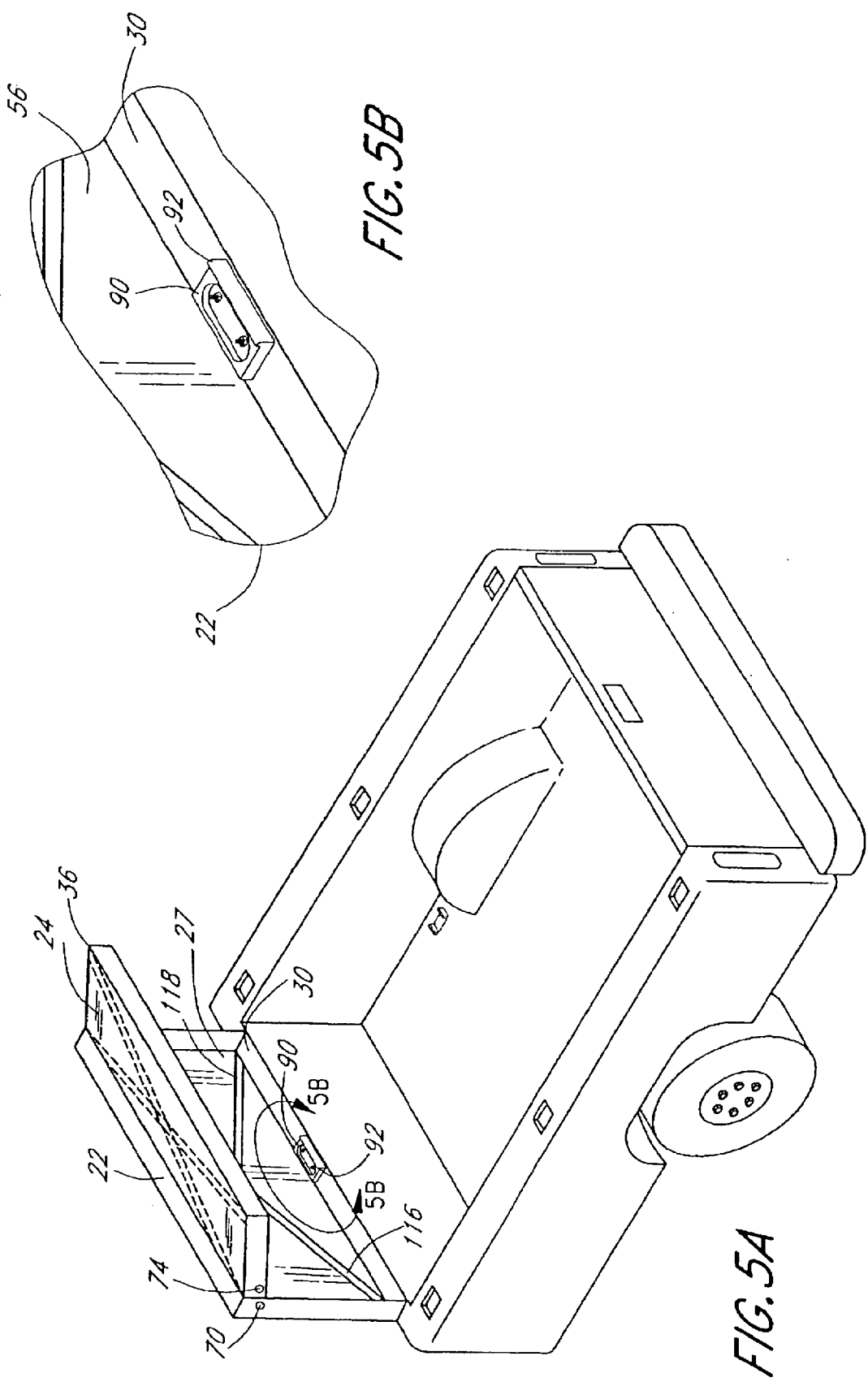

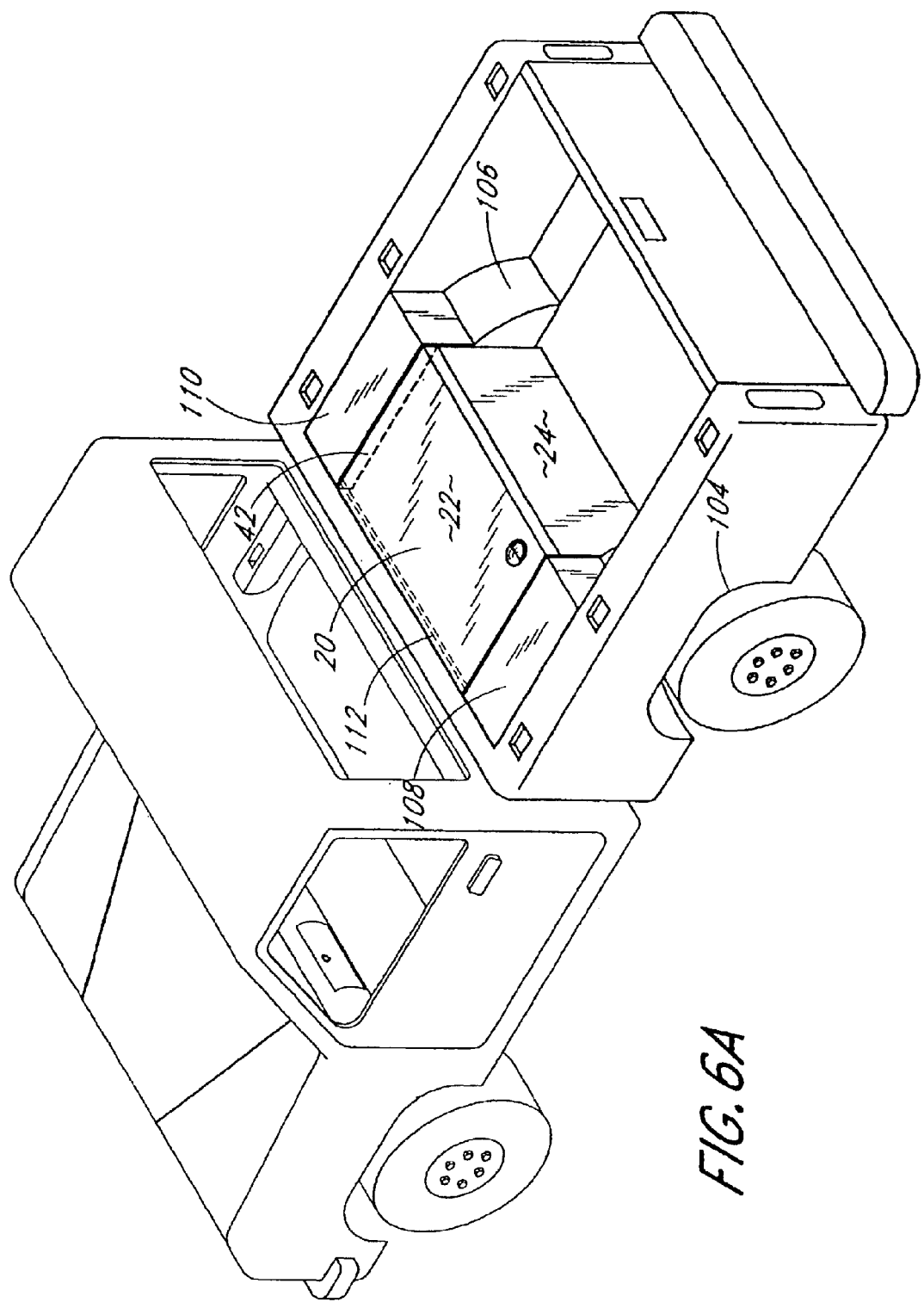

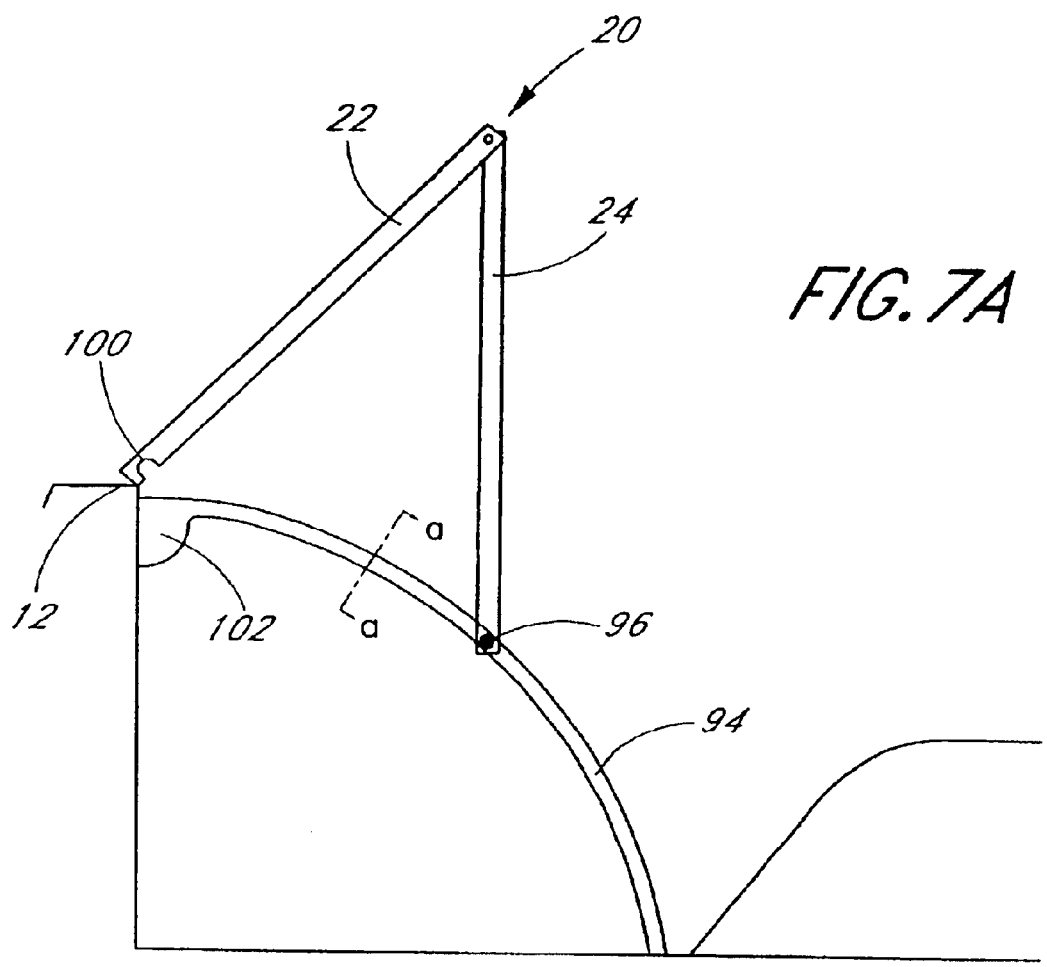

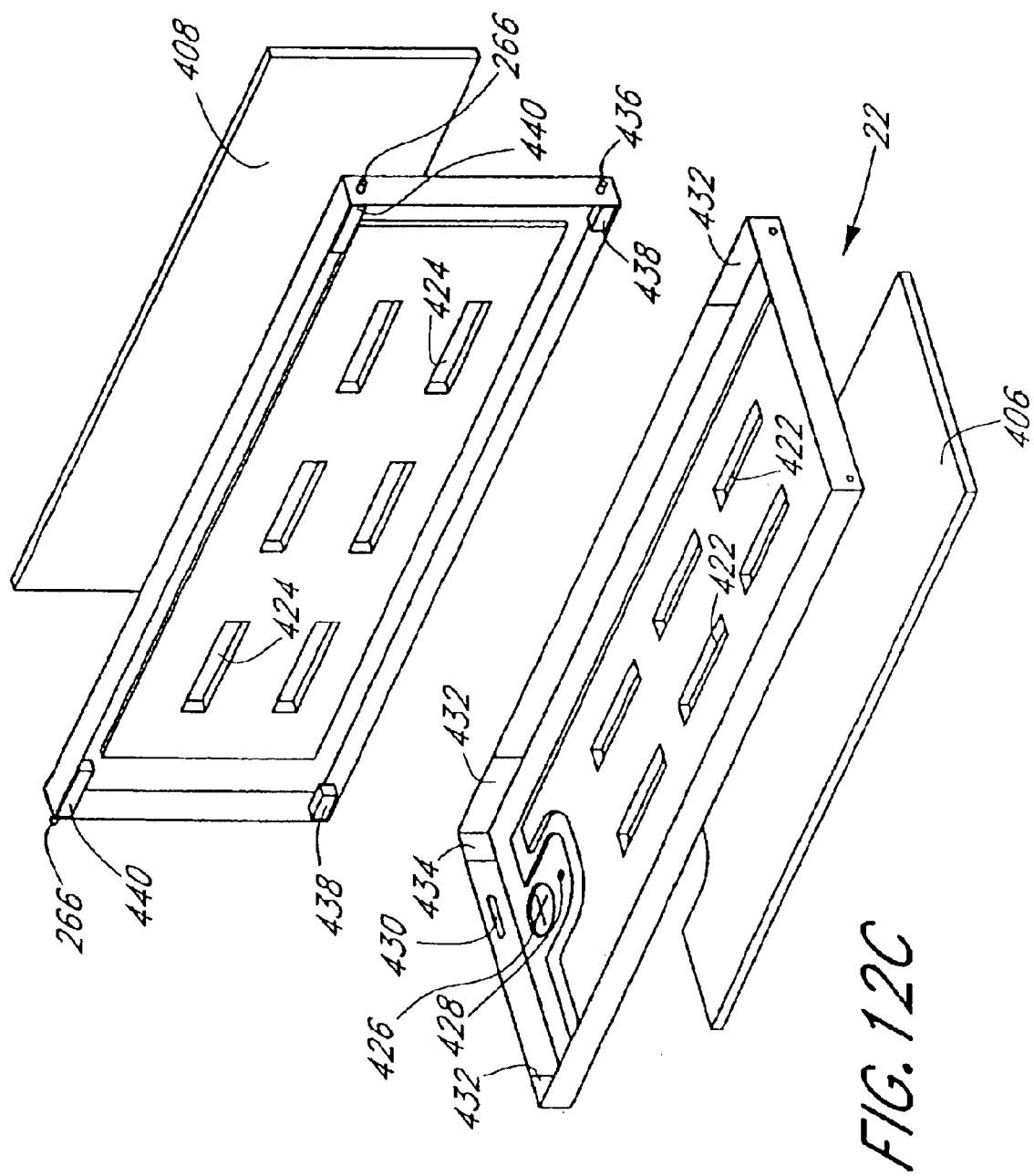

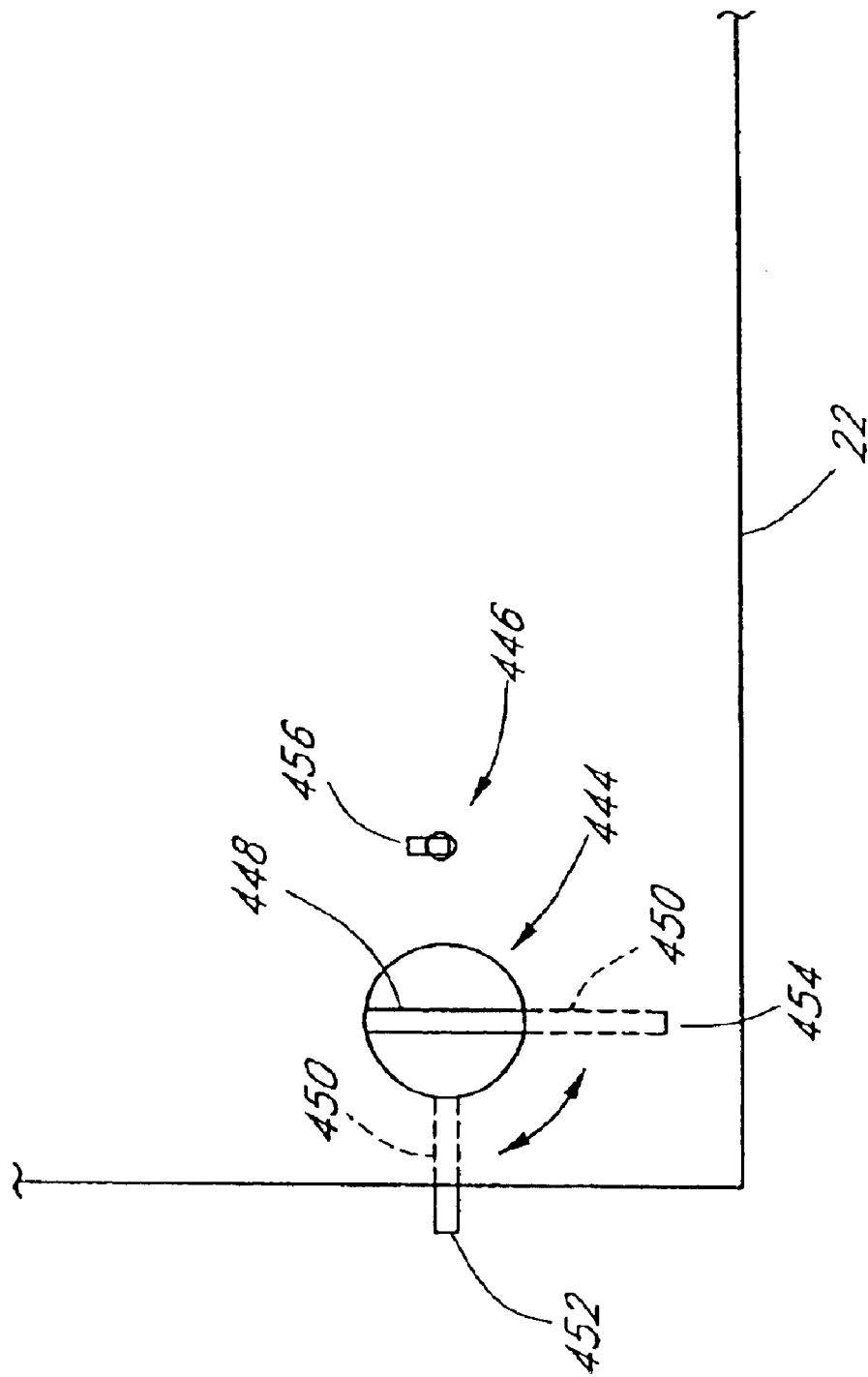

VEHICLE BED STORAGE BOX

RELATED APPLICATIONS

This application is a continuation of U.S. patent application Ser. No. 10/282,954, filed Oct. 28, 2002, titled VEHICLE BED STORAGE BOX, now U.S. Pat. No. 6,644,711 which is a continuation of U.S. patent application Ser. No. 09/846,577, filed May 1, 2001, titled VEHICLE BED STORAGE BOX, now U.S. Pat. No. 6,471,278, which is a continuation of U.S. patent application Ser. No. 09/488,207, filed Jan. 19, 2000, titled VEHICLE BED STORAGE BOX, now U.S. Pat. No. 6,257,640, which claims the benefit of U.S. Provisional Patent Application No. 60/117,098, filed Jan. 25, 1999, titled VEHICLE BED STORAGE BOX. The entire contents of each of the above-listed patents, patent applications and provisional patent applications are hereby incorporated by reference herein and made a part of this specification.

BACKGROUND OF THE INVENTION

1. Field of the Invention

This invention relates to a storage device for a vehicle and, in particular, a vehicle bed storage box.

2. Background of the Invention

Vehicles with storage beds, such as pick-up trucks, are tremendously popular due to their utility in transporting large objects for work and recreation. Unfortunately, because the storage bed is typically open, articles stored within the storage bed are exposed to the elements and may be inadvertently lost and/or stolen from the open truck bed. One of the most common items stored in the vehicle storage bed is a tool box.

Such tool boxes have a generally rectangular shape and have a top surface which is horizontal with a handle extending therefrom. This configuration provides ease of transportation and access, and optimizes the interior shape and volume for the storage of large items.

3. Discussion of Known Art

There has been a long felt need for an improved truck bed mounted storage device which is either collapsible or easily removable. However, many of the attempts made to address this need have suffered from one or more flaws.

A recent example of such an attempt is U.S. Pat. No. 5,853,116 to Schreiner. The Schreiner device is a collapsible storage box which attaches to the tailgate of a truck bed. However, this device requires either removal and replacement of the entire tailgate or attachment of the device on top of an existing tailgate, which makes the gate very heavy to use. The Schreiner apparatus also prevents quick sliding of items in or out of the truck bed without first collapsing the storage unit and removing the items stored inside of it.

U.S. Pat. No. 5,169,200 to Pugh discloses a truck bed storage box which is intended to be removable. However, this device does not fold up and store quickly and easily within the truck bed. Instead, the loose pieces of the box must be either stored in the bed itself or left behind elsewhere outside of the truck, which prevents the box from being replaced in the bed for further use without first returning to the place where the pieces of the box are stored. Similarly, U.S. Pat. No. 5,037,153 to Stark and U.S. Pat. No. 4,635,992 to Hamilton each provide a way to move a storage box back and forth on a truck bed, but neither of these patents discloses a means for folding a storage box; rather, the box must be removed entirely and left behind and stored externally in order to use the entire truck bed.

U.S. Pat. No. 4,828,312 to Kinkel, U.S. Pat. No. 4,749,226 to Heft, and U.S. Pat. No. 4,451,075 to Canfield all disclose a collapsing truck bed storage box which is used adjacent to the truck bed tailgate. These devices thus prevent use of the tailgate when the box is deployed. Items cannot be easily slid in and out of the truck bed without removal of the storage device itself and the items stored within it. All of these devices also fold onto the truck bed when not in use, which interferes with the storage of items in the truck bed and exposes the panels of these devices to bending or crushing when heavy loads are being hauled by the truck. Finally, the Canfield device has an angled orientation when deployed, which is not optimal for storing items inside of it.

U.S. Pat. No. 4,750,773 to Chapline discloses a folding truck bed box which permits full use of the tailgate. However, part of the box folds onto the bed which is troublesome for the hauling of heavy loads for the reasons outlined above.

U.S. Pat. No. 1,764,615 to Edwards discloses a truck body partition which can be used to section off a portion of the truck bed. However, this device does not enclose a storage area and thus it leaves items exposed when in use. Furthermore, the Edwards device, when rotated into the storage position, prevents easy removal of items up and out of the truck bed.

Wind deflectors are also known in the art. Wind deflectors are mounted at the rear of the vehicle bed to reduce drag on the vehicle due to the tailgate. U.S. Pat. No. 5,743,589 to Felker discloses a wind deflector which assumes an angled orientation when deployed. In addition to not being intended as a storage device, the angled orientation is inefficient for storing items. Installation of the Felker device requires modifications of either the existing bed surface or a modification of the tailgate, neither of which are desirable to a user of any bed storage device. Finally, in at least one embodiment of the Felker device, it folds flat onto the truck bed surface itself, and in this position the panels of the device could be bent or crushed by heavy loads placed in the truck bed.

SUMMARY OF THE INVENTION

One aspect of the present invention is an improved collapsing storage device for use in a vehicle bed.

Another aspect of the invention is a storage device which is quickly and easily collapsed and/or deployed by the user, and which in the collapsed state leaves substantially the entire vehicle bed available for use without obstruction.

Desirably, another aspect of the invention is a collapsing storage device which may be installed without removing or substantially modifying any part of the vehicle bed.

Advantageously, one aspect of the invention is an apparatus for cooperating with existing walls surrounding a vehicle storage bed to form an enclosed container. Desirably, the container is collapsible to permit substantially the entire vehicle bed to be used for transportation of large objects when the storage box is not in use.

One aspect of the invention is a storage apparatus including a first panel and a second panel. The first panel is rotatably secured to an existing wall surrounding the storage bed, and the second panel is rotatably secured to an opposite end of the first panel. The panels may be rotatably secured by hinges. The storage apparatus has a deployed or storage position wherein a first surface of the first panel extends upward and a first surface of the second panel extends outward from the existing vehicle bed panel to which the first panel is rotatably secured. The apparatus also has a retracted or folded away position in which the first surface of the second panel is positioned facing and adjacent the existing wall of the vehicle and the first surface of the first panel extends upright and outward from the such existing wall of the vehicle.

Advantageously, a first interlock portion and a second interlock portion are provided for locking the first and the second panel folded together to facilitate easier deployment and/or retraction of the apparatus.

The storage apparatus may utilize one or more tracks which cooperate with track followers extending from the second panel to facilitate movement of the storage apparatus between the deployed position and the folded position.

Another aspect of the present invention is a collapsible vehicle bed storage assembly mountable on a vehicle having a generally horizontal storage bed surrounded by a front wall, a first sidewall, a second sidewall and a back wall. The assembly comprises a first panel having an outer face and inner face, a first end, a second end, a first side and a second side, the first end of the first panel being secured to one of the walls so as to be rotatable about a generally horizontal axis. The assembly also has a second panel having an outer face, an inner face, a first end, a second end, a first side, and a second side, the first end of the second panel being secured to the second end of the first panel so as to be rotatable about a generally horizontal axis. The first panel and the second panel are locked in a folded-together orientation wherein the inner face of the second panel faces the inner face of the first panel, and the assembly is freely rotatable about the first end of the first panel, while the first panel and the second panel remain locked in that orientation.

Still another aspect of the present invention is a collapsible vehicle bed storage assembly mountable on a vehicle having a generally horizontal storage bed surrounded by a front wall, a first sidewall, a second sidewall and a back wall. The assembly comprises a first panel having an outer face and inner face, a first end, a second end, a first side and a second side, the first end of the first panel being secured to one of the walls so as to be rotatable about a generally horizontal axis. The assembly also has a second panel having an outer face, an inner face, a first end, a second end, a first side, and a second side, the first end of the second being panel secured to the second end of the second panel so as to be rotatable about a generally horizontal axis. Also included is at least one track mounted in the vehicle storage bed on one side of the assembly and at least one track follower mounted on the corresponding side of the second panel, the track and the follower cooperating to control the deployment of the assembly. The assembly has a collapsed position in which the first panel and the second panel are generally vertical and the inner face of the first panel and the inner face of the second panel face one another, and a deployed position in which the first panel is generally horizontal and the second panel is generally vertical, the outer face of the first panel facing outward away from the storage bed and the outer face of the second panel facing outward away from the front wall.

The present invention also encompasses a method for enclosing a volume of a vehicle bed having a generally horizontal storage bed surrounded by a front wall, a first sidewall, a second sidewall and a back wall, the method comprising the steps of: (1) rotating an assembly comprising a first panel and a second panel folded together, the first panel being rotatably secured to one of the walls at a first end of the first panel, the second panel being rotatably secured to a second end of the first panel opposite the first end, from a vertical position; (2) rotating the second panel away from the first panel so that the first panel and the second panel are no longer folded together; and (3) placing an end of the second panel against the vehicle bed with the second panel in a substantially vertical position and the first panel in a substantially horizontal position.

BRIEF DESCRIPTION OF THE DRAWINGS

FIGS. 4A–4C show one embodiment of a means for locking the two panels of the collapsible storage device folded together, and for locking the collapsible storage device in the deployed or the folded away position.

FIGS. 5A and 5B show the storage box being opened, along with another embodiment of a means for locking the two panels of the collapsible storage device folded together.

FIGS. 6A and 6B show another embodiment of the collapsible storage device in association with additional storage bins.

FIGS. 7A–7B show an alternative storage box which incorporates a track on one or both sides (mirror image).

FIGS. 12A–12D are perspective views of the panels to be used with the embodiment of FIG. 9.

FIG. 13 is a schematic view of a latch and lock to be used with the panels of FIG. 12.

DETAILED DESCRIPTION OF THE PREFERRED EMBODIMENT

Figure 1:
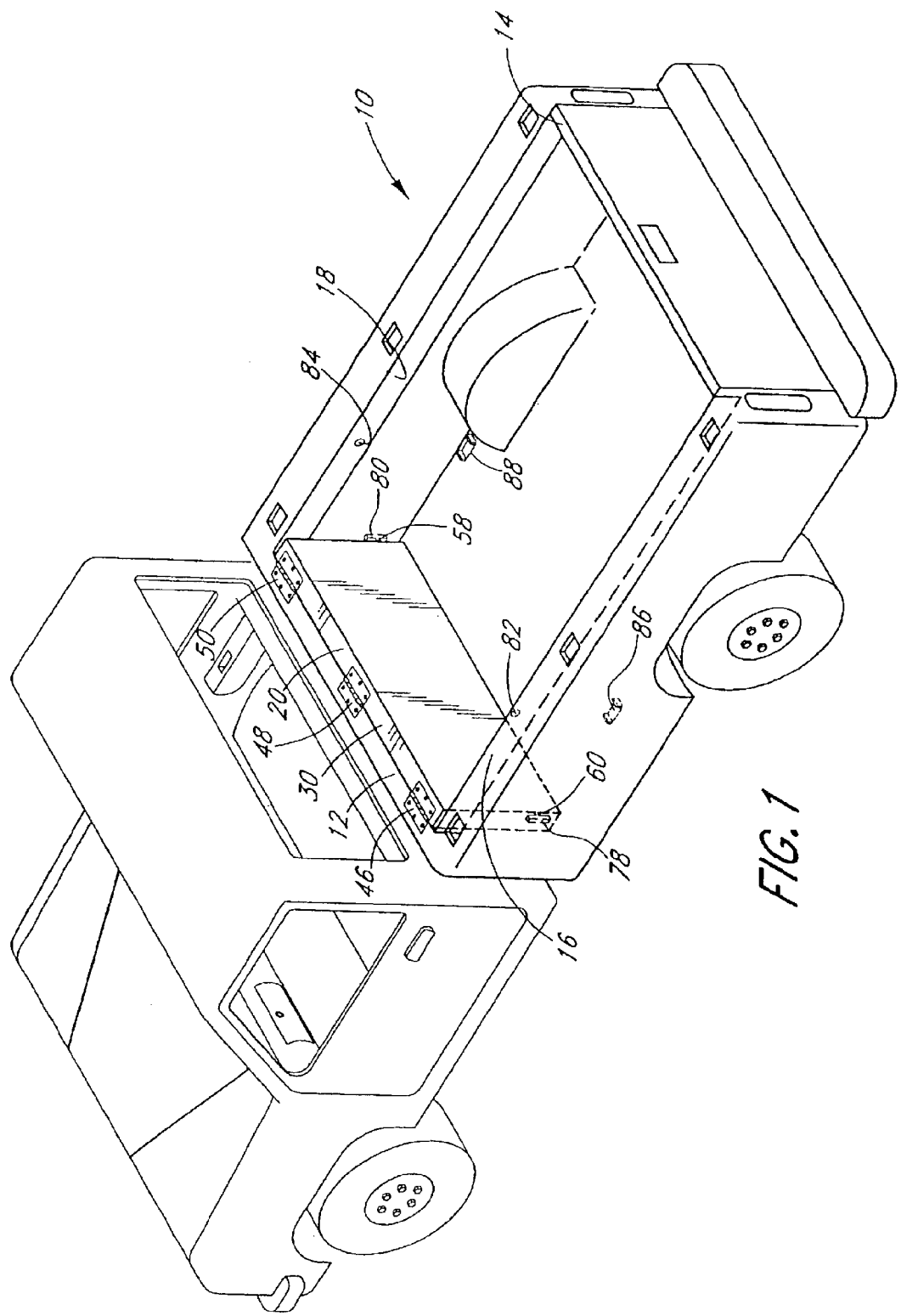
FIG. 1 is a perspective view of the collapsible storage device folded away in a vehicle bed.
Figure 2:
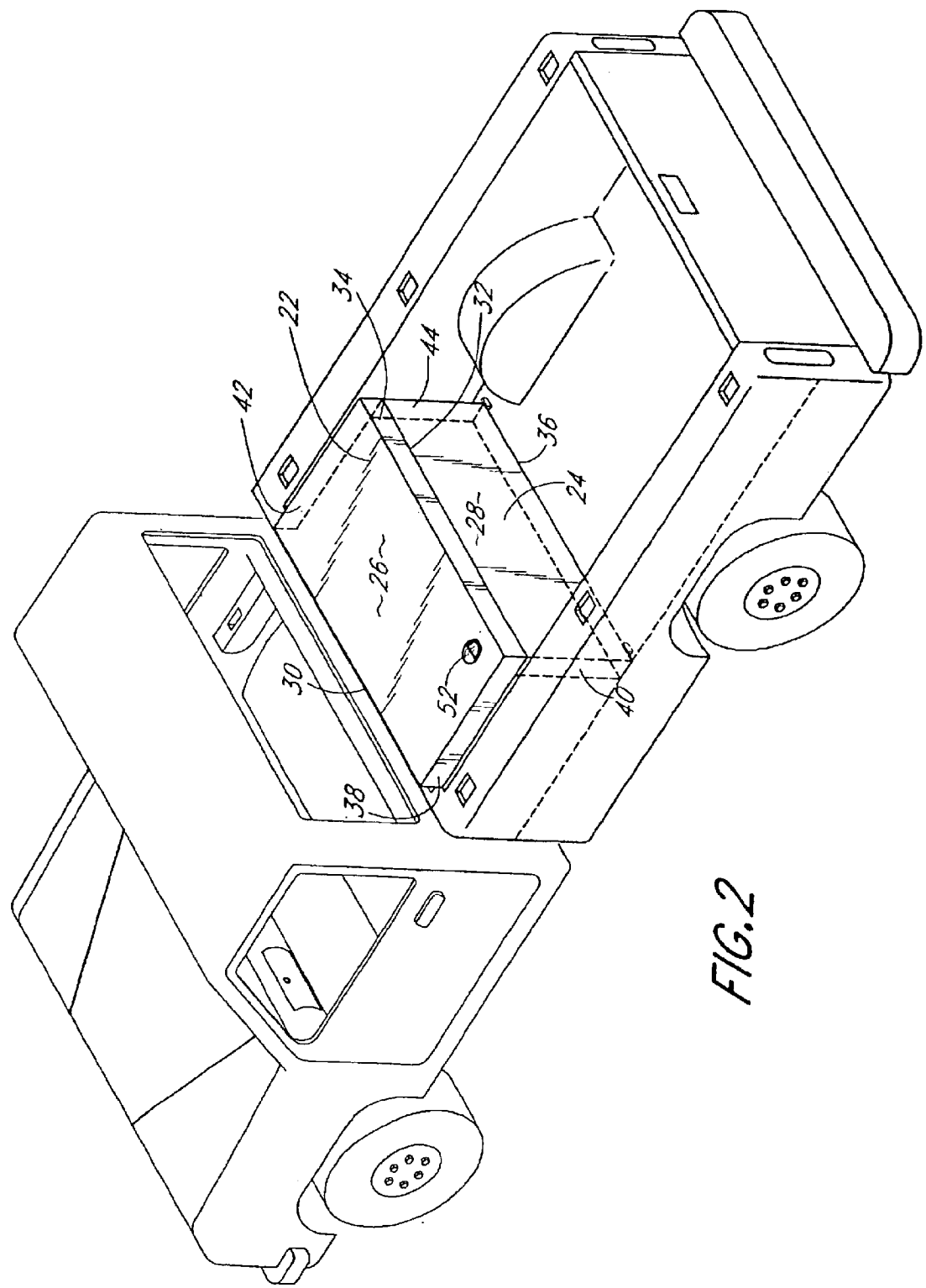
FIG. 2 is a perspective view of the collapsible storage device fully deployed.

FIGS. 1 and 2 show a vehicle bed 10 with front and back walls 12 and 14 and first and second sidewalls 16 and 18. Disposed within the bed 10 is a collapsible storage device 20 in accordance with the present invention. The collapsible storage device 20 includes a first panel 22 and a second panel 24. First panel 22 includes an outer face 26 and an inner face 27 (see FIG. 3D), a first end 30 and a second end 34, as well as a first side 38 and a second side 42. Likewise, second panel 24 includes an outer face 28 and an inner face 29 (see FIG. 3D), a first end 32 and a second end 36, as well as a first side 40 and a second side 44.

It is contemplated that the panels 22, 24 may be constructed of various materials, such as steel, aluminum, a heavy-duty plastic such as ABS or PVC, nylon, fiberglass, or wood. Steel used in the construction of the panels 22, 24 may be of the diamond-plate type. As illustrated in FIG. 5A, reinforcing members 116 and 118 may be added across the inner face of one or both of the panels to improve resistance to bending, impacts or dents. Such reinforcing members can permit the thickness and weight of the panels 22, 24 to be reduced.

Figure 3A:
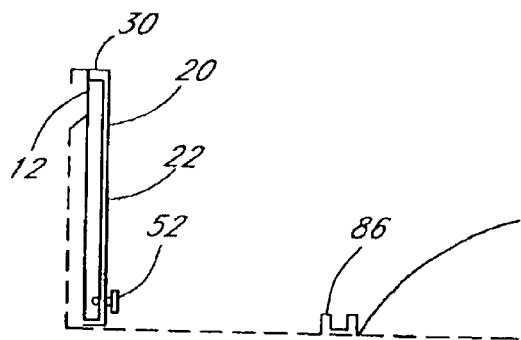
FIGS. 3A–3D are schematic views showing the storage device being deployed.

The second end 36 of the second panel 24 may be contoured as necessary to match features on the bed surface and sides, such as protruding portions of the wheel wells or ribs, etc., on the bed floor. The width and height of the first and second panels 22 and 24 may be varied as necessary to substantially match the width and depth of beds found on different models of vehicles found on the market. The second panel 24 may desirably be sized so as to fold and nest into first panel 22 as shown in FIGS. 3A and 3B.

The first end 30 of the first panel 22 is rotatably attached to the vehicle along the front wall 12 of the bed 10. The first end 32 of the second panel 24 is rotatably attached to the second end 34 of the first panel 22, by a plurality of hinges disposed along its length. It is contemplated that the panels 22, 24 could also be rotatably connected by one long hinge, an axle or axle stubs, or other means known to those of skill in the art.

On its outer face 26, the first panel 22 is equipped with a handle 52 which is rotatable about an axis perpendicular to the panel 22. Handle 52 is located off-center on first panel 22 so that a person standing to one side of the vehicle bed can easily grasp it and use it to deploy or retract the collapsible storage device. The handle 52 turns a rotor 54 (see FIGS. 4A–4C) located on the inner face 27 of the first panel 22. To the rotor 54 are attached rods 58, 60 which can rotate about an axis perpendicular to the rotor 54 at their attachment points 62, 64. Rotation of the handle 52 moves the ends of the rods 58, 60 from an extended (FIG. 4A) to a retracted position (FIG. 4B). Rotation of the handle 52 is limited so that the ends of rods 58, 60 cannot be retracted beyond rod guides 66, 68.

The rods 58, 60 communicate with holes 70, 72 in the first and second sides 38, 42 of the first panel 22 and with holes 74, 76 in the first and second sides 40, 44 of the second panel 24. When the second panel 24 is folded into the first panel 22 as shown in FIGS. 3D and 4C, rod 58 can extend through hole 74 in the first side 40 of the second panel 24 and through hole 70 in the first side 38 of the first panel 22, and rod 60 can extend through hole 76 in the second side 44 of the second panel 24 and through hole 72 in the second side 42 of the first panel 22. By extending the rods 58, 60 in this manner, one can lock the first and second panels 22, 24 together in the folded orientation and they can be rotated as a unit about the point of attachment to the vehicle as necessary. This locking feature promotes ease of opening and closing the collapsible storage device 20.

When the collapsible storage device 20 is folded into the collapsed position as shown in FIG. 1, the rods 58, 60 can be extended so as to be received or retained by the stops 78, 80 mounted on the first and second sidewalls 16, 18 of the bed 10, so as to prevent the device 20 from moving about when it is not in use. The stops 78, 80 may be simple blocks or bars of metal or some other suitable material, attached to the sidewalls 16, 18 and extending inward therefrom. One of ordinary skill in the art will appreciate that other means, such as holes in the sidewalls 16, 18, will perform the same function of receiving and retaining the extended rods 58, 60.

When the collapsible storage device 20 is expanded into the deployed or storage position, the rods 58, 60 can be extended into holes 82, 84 in the inner faces of the first and second sidewalls 16, 18 of the bed 10 to hold the device 20 in the deployed position. The height of the second panel 24 may be selected so as to create a slight downslope, toward the rear of the bed, in first panel 22 when the device 20 is in the deployed position. This permits rods 58, 60 to better match up with holes 82, 84 when the first end 30 of the first panel 22 is hinged to the top of the front wall 12 of the bed 10 (and is therefore higher than the holes 82, 84).

Guide channels 86, 88 may be provided inside of the first and second sidewalls 16, 18 of the bed 10 to hold the second panel 24 in place when the assembly 20 is in the deployed or storage position. Desirably, the guide channels 86, 88 are U-shaped brackets made of metal or other suitable rigid material. The guide channels 86, 88 are sized so that second end 36 of the first panel 24 fits snugly between the two vertically extending sides of the "U," to effectively retain the second panel 24 in place when the device 20 is in the deployed position.

Figure 2A:
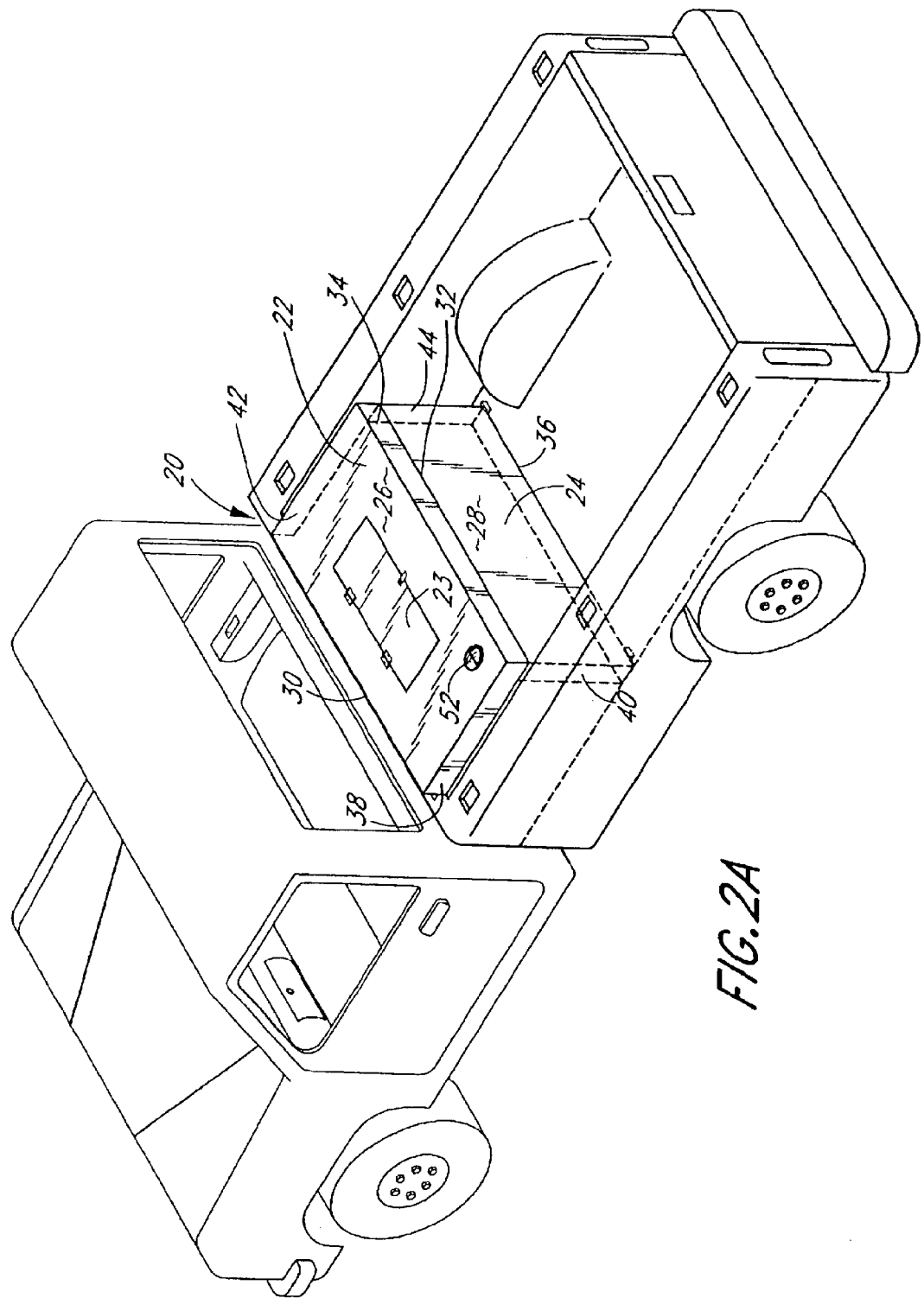
FIG. 2A is a perspective view of the collapsible storage device fully deployed, and incorporating an access door in the first panel.

FIG. 2A shows a collapsible storage device 20 with a hinged access door 23 located in the first panel 22. The access door 23 facilitates quick, easy access into the space enclosed by the collapsible storage device 20 without opening or collapsing the entire device. The access door 23 can be simply cut out of the face of the first panel 22, and mounted to the panel using sturdy hinges and a latch of sufficient strength to withstand likely impacts and other forces. Desirably, the access door can be a sheet of similar material as is used to make the panels 22, 24, but oversized slightly with respect to the opening in the first panel 22, so as to provide a better seal (by overlap) with the face of the panel. Alternatively, the edges of the access door 23, and/or the edges of the opening in the first panel 22, can have a gasket of rubber or other resilient material, to provide the necessary seal. The access door 23 may also incorporate a lock (locks will be discussed in greater detail below) to prevent unauthorized access into the storage device 20.

Figure 3C:
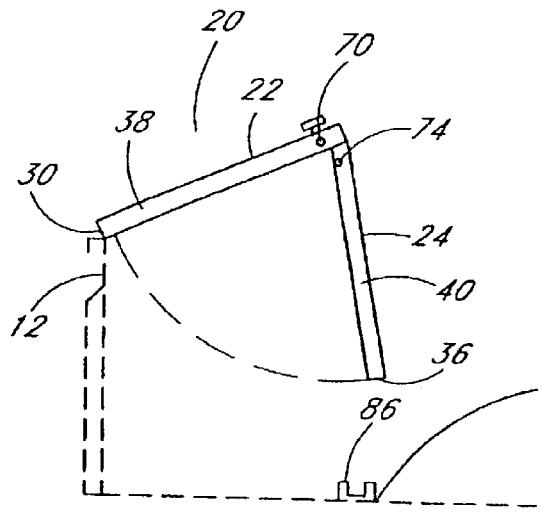
Figure 3B:
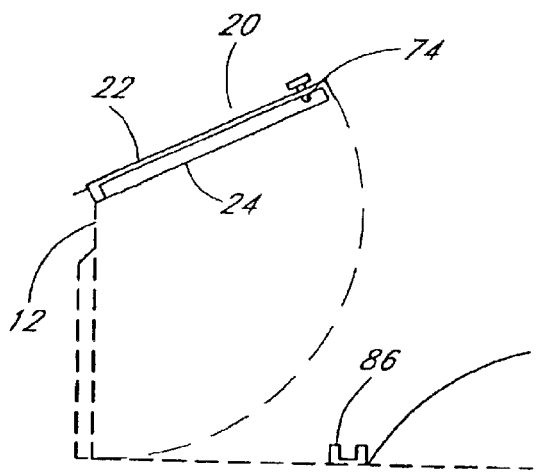
Figure 3D:
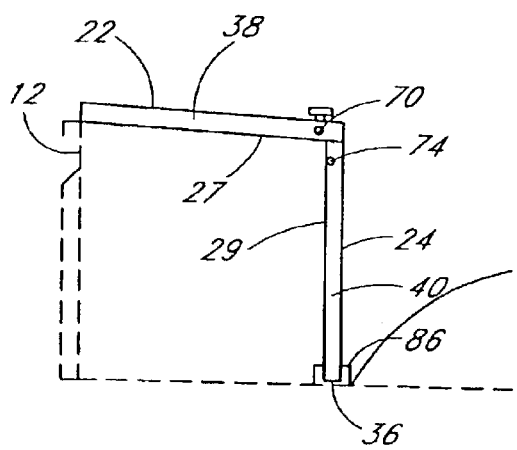
Figure 4A:
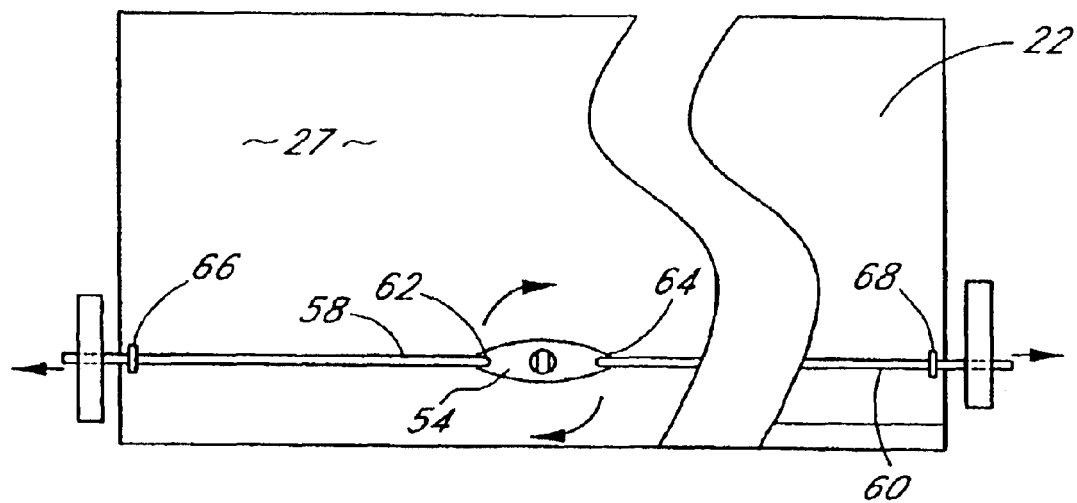
Figure 4B:
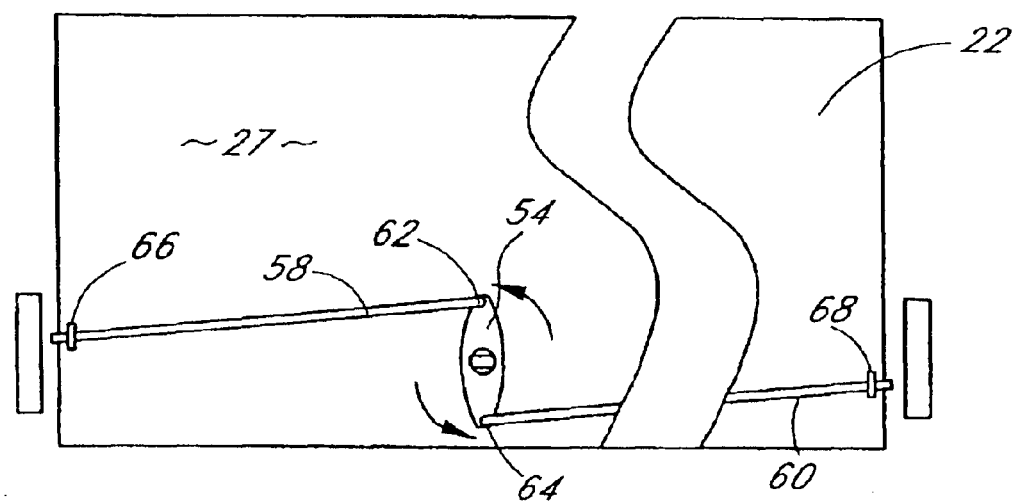

FIGS. 3A–3D schematically show the opening procedure in detail, with additional reference to FIGS. 4A–4B. In opening the device 20, the user grasps and rotates the handle 52 until the rods 58, 60 retract so that they no longer extend beyond the stops 78, 80 (shown in FIG. 1). At this point the user, by simply pulling back on the handle 52, can rotate the device 20 about the first end 30 of the first panel 22 until the device 20 reaches a suitable point as shown in FIG. 3B. Then, by a slight additional rotation of the handle 52, the user causes the rods 58, 60 to retract further, until they no longer extend through the holes 74, 76 in the first and second sides 40, 44 of the second panel 24., The weight of the second panel 24 then causes it to automatically rotate away from the first panel 22 (as shown in FIG. 3C) with no further effort from the user. The second end 36 of the second panel 24 is then easily placed in guide channels 86, 88 on the bed surface, as shown in FIG. 3D. The user completes the opening process by rotating the handle 52 so that the rods 58, 60 extend into the holes 82, 84 in the inner faces of the first and second sidewalls 16, 18 of the bed 10.

Advantageously, the volume of the resulting enclosed area is at least 12,500 cubic inches. Desirably, the enclosed volume is at least 15,000 cubic inches, and is preferably at least 20,000 cubic inches. These desired or preferred storage volumes correspond to a preferred first panel 22 height (when deployed) of about 20" from the bed surface, and a preferred first panel 22 length (measured from fore to aft of the vehicle when the device is deployed) of about 16".

FIGS. 5A and 5B show an alternative means of holding the second panel 24 against and parallel to the first panel 22.

A clip 90 is mounted along the first end 30 of the first panel 22 adjacent to the inner face 27 of the first panel 22. The clip 90 is made of a resilient material, possibly rubber or a hard plastic such as Delron. The clip 90 has a protruding portion 92 on its edge opposite the inner face 27 of the first panel 22. The clip 90 and protruding portion 92 are sized to permit, upon exertion of moderate pressure, the second end 36 of the second panel 24 to pass the protruding portion 92, whereby the second panel 24 can swing closed against the first panel 22. With no intervention from the user, the protruding portion 92 then holds the second panel 24 in the closed position against the first panel 22. The two panels, clipped together in this manner, can be rotated about the point of attachment to the vehicle as necessary. The protruding portion 92 also permits, upon application of moderate pressure, the second end 36 of the second panel 24 to pass in the opposite direction from that mentioned above, thereby permitting deployment of the device 20 to the deployed position. It is contemplated that the clip 90 may be positioned at other points adjacent to the inner face 27 of the first panel 22, such as on the first or second side 38, 42 of the first panel 22, and that more than one clip 90 may be used to retain the second panel 24 against the first panel 22.

Figure 7B:
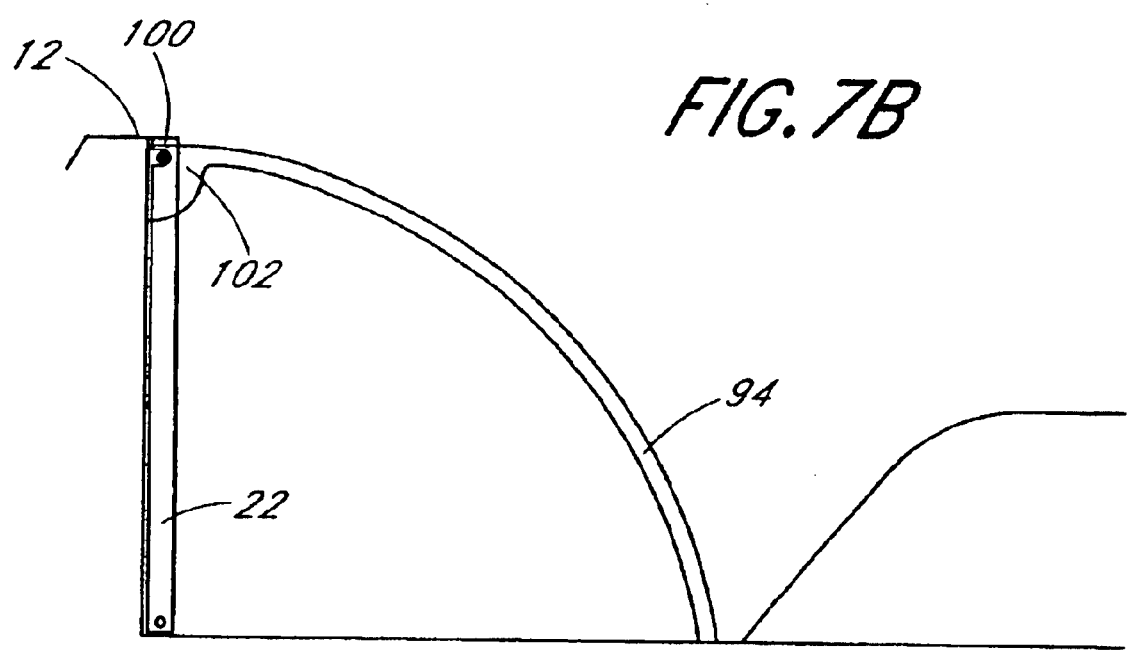
Figure 7C:
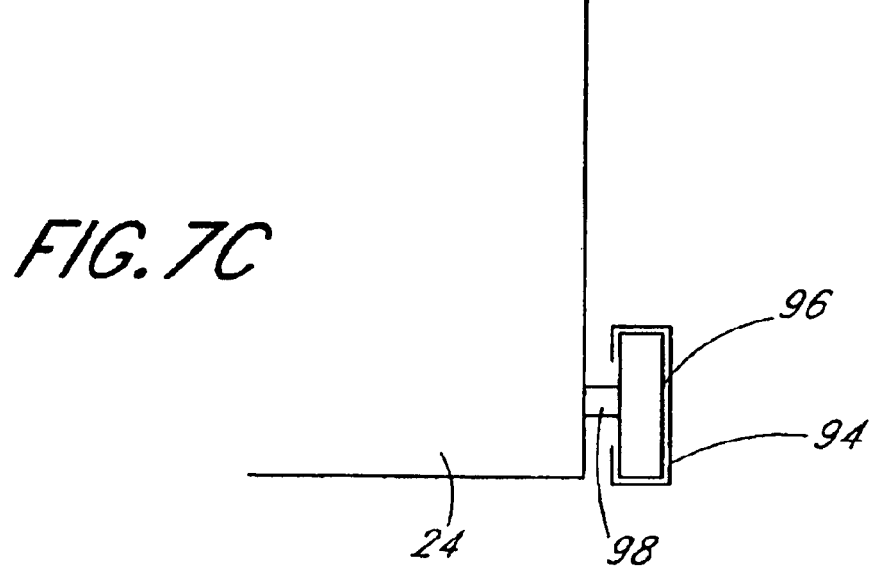
FIG. 7C is a view along a—a of FIGS. 7A–7B illustrating the cross-section of a track follower in the guiding track.

FIGS. 7A–7C show a curved track 94 which may be used to guide deployment of the collapsible storage device 20. Such a track may be mounted on one or both sides of the collapsible storage device 20, generally parallel to and against the first or second sidewalls 16, 18 of the bed 10. Each track 94 curves from the horizontal surface of the vehicle bed 10 up to the point of attachment of the first panel 22 to the front wall 12 of the vehicle bed 10. At the top of this curve the track 94 extends downward to form a storage section 102, the use of which will be described below.

As seen in FIG. 7C, each track 94 has a C-shaped cross-section. The track 94 thus encloses a track follower 96 mounted on one or both sides of the second panel 24. The track follower 96 can move freely along the length of the track 94, but the track follower is contained within the "C" shape of the track. It is contemplated that the track follower 96 comprises a wheel which may freely rotate about an axle stub 98 attached to the second panel 24, but other forms of track follower are possible, such as a simple peg.

The track 94 cooperates with the track follower 96 to control deployment of the collapsible storage device. When the device 20 is being opened or closed, the track 94 assists in both supporting the weight of the device and in guiding the user's movement of the panels 22 and 24, which greatly reduces the effort required from the user when opening the device 20. The storage section 102 of the track 94 retains the track follower 96 when the device 20 is in the collapsed position as shown in FIG. 7B.

Figure 6B:
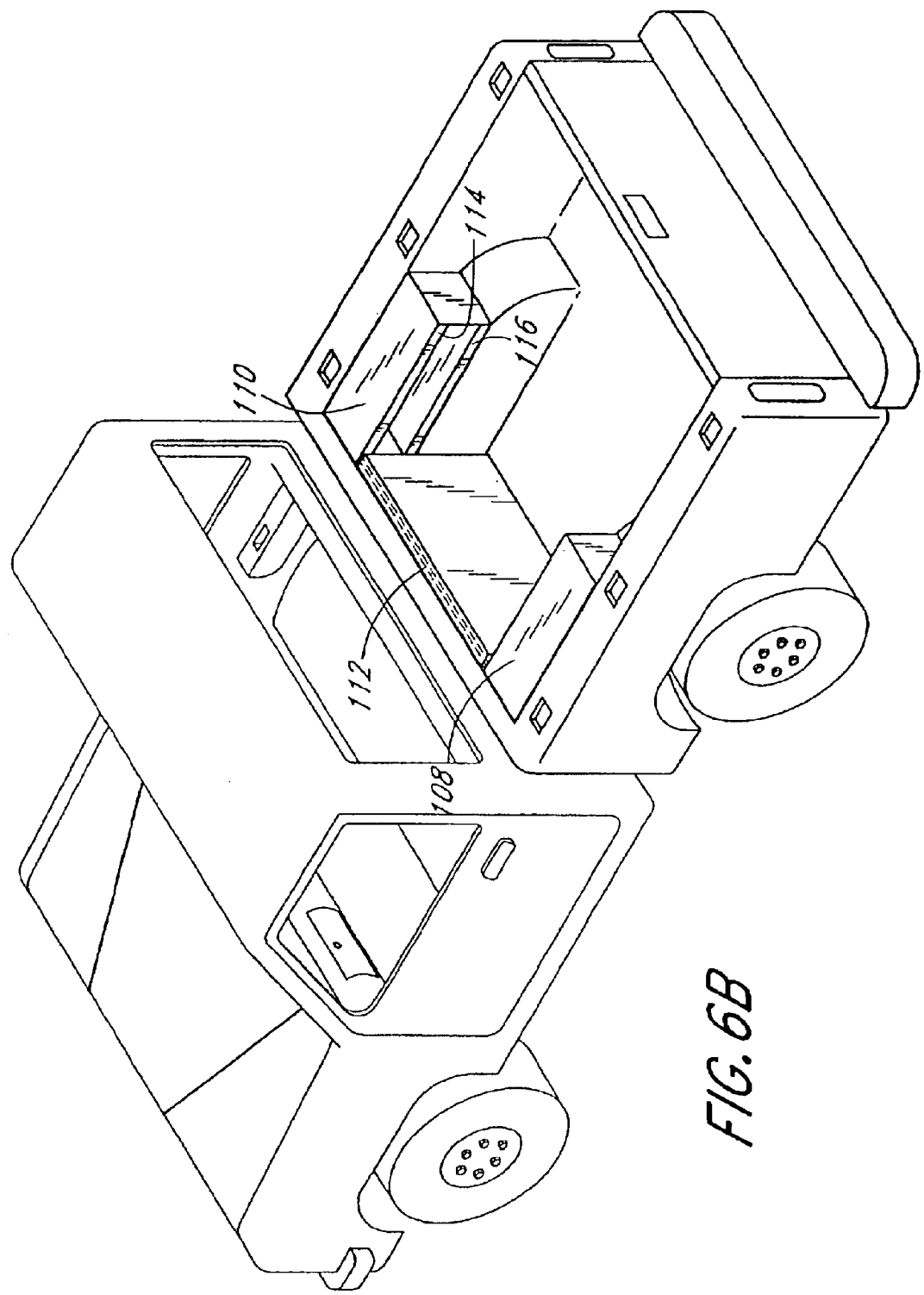

FIGS. 6A and 6B show an alternative embodiment of the collapsible storage device 20 for use with those vehicles with wheel wells situated near, or intersecting with, the front wall 12 of the bed 10. In this case, the panels 22, 24 of the collapsible storage device 20 are desirably about as wide as the available space between the wheel wells 104, 106. On either side of the collapsible storage device 20 above the wheel wells are storage bins 108, 110. Each storage bin is enclosed on all sides except the inward-facing side, which has a top inner wall 114 and a bottom inner wall 116. When the storage device 20 is in the deployed position as shown in FIG. 6A, the top inner wall 114 cooperates with the first or second side 38, 42 of the first panel 22 to prevent easy pry-in between the first panel 22 and the top of the storage bins 108, 110. The bottom inner wall 116 creates a handy storage bin or shelf which is separate from the main volume enclosed by the storage device 20 when in the deployed position, or is a simple open bin useful even when the storage device 20 is in the folded position.

Figure 8:
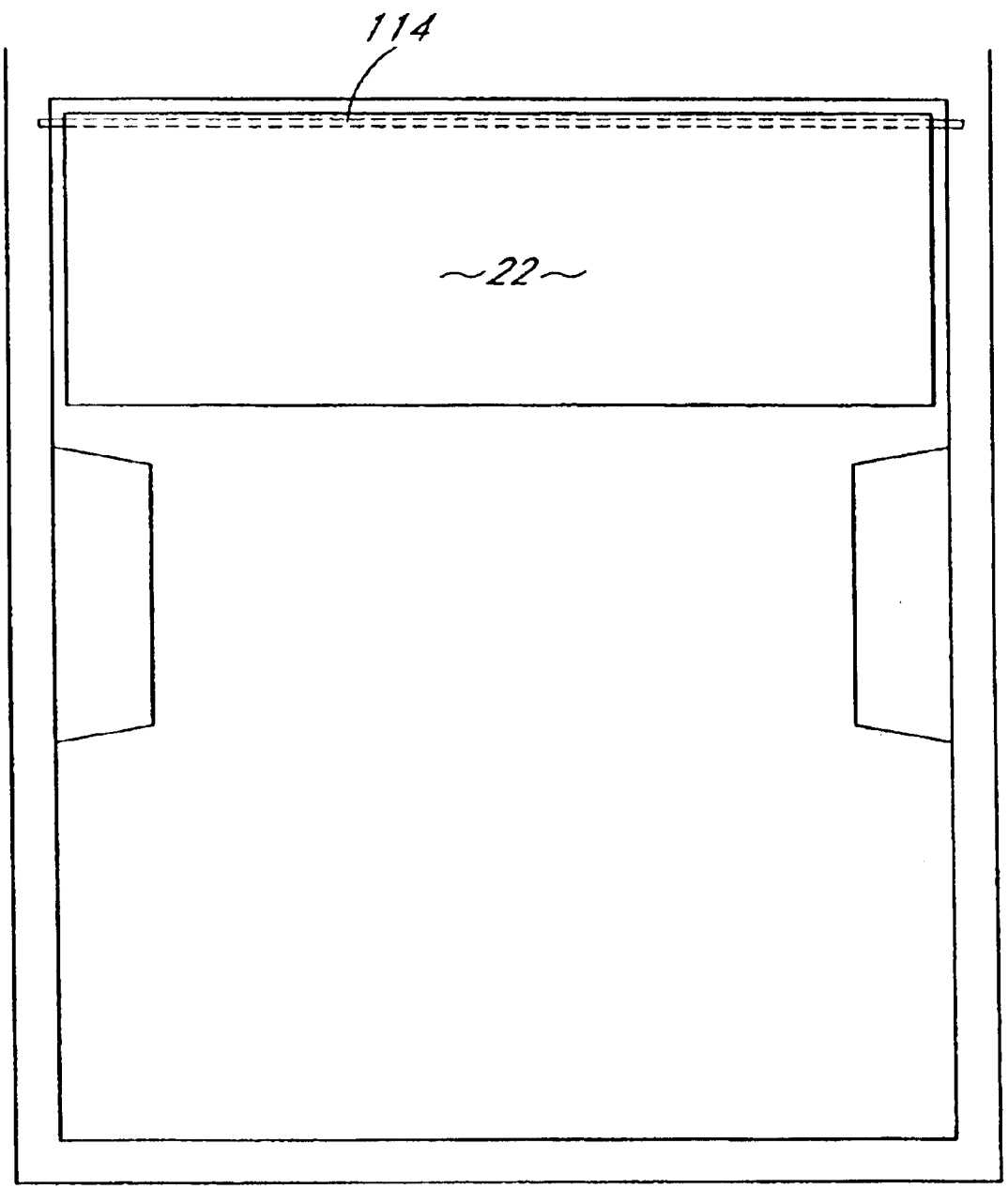
FIG. 8 shows an alternative means for rotatably attaching the collapsible storage device to a vehicle bed.
Figure 9:
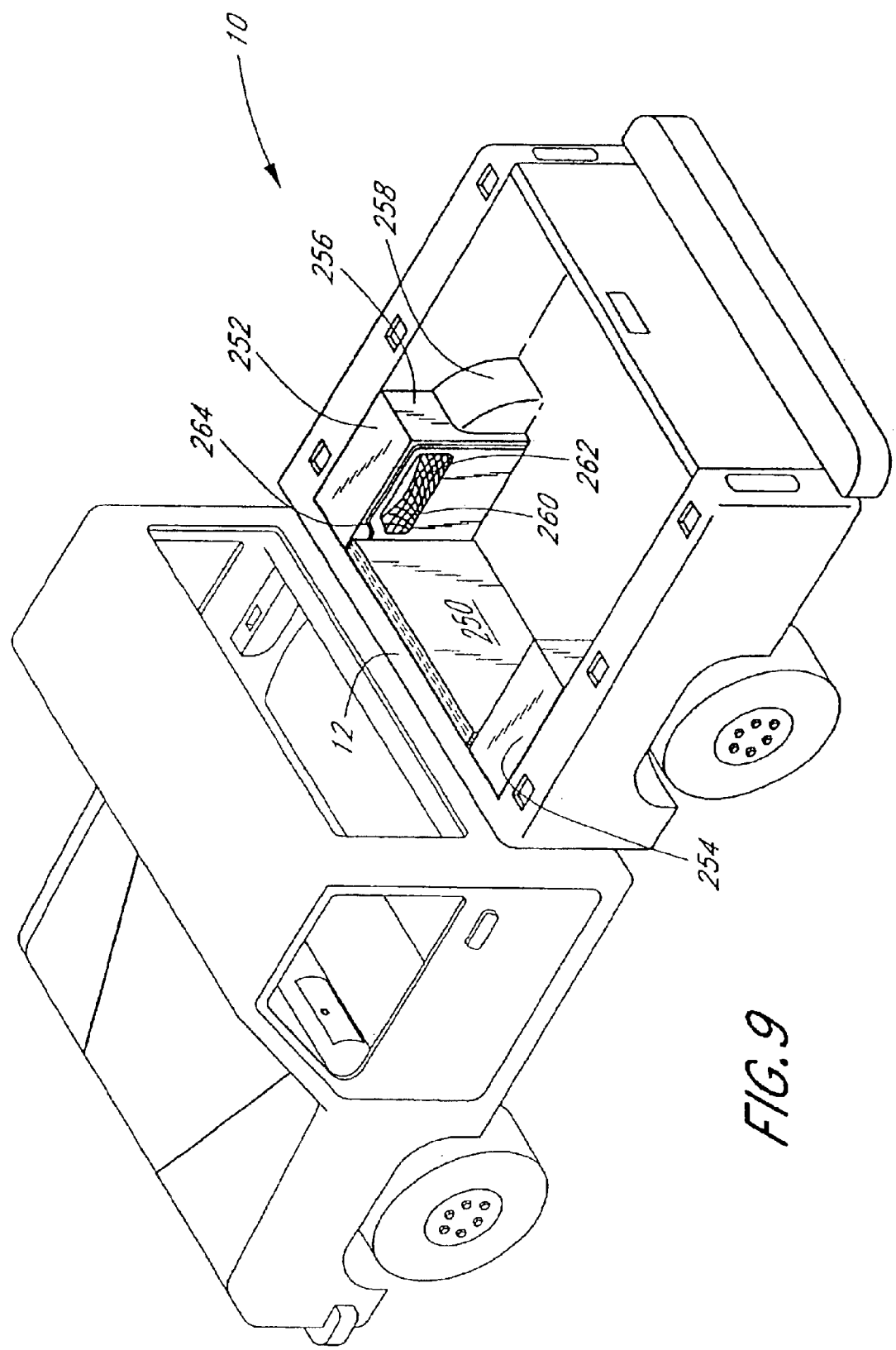
FIG. 9 is a perspective view of another embodiment of the collapsible storage device employing a track to guide deployment and/or collapse.

Various devices for mounting the collapsible storage device 20 to the vehicle are contemplated by the present invention. The first means comprises hinges 46, 48, 50 rotatably connecting the first end 30 of the first panel 22 to the top surface of the front wall 12 of the bed 10. A second means is to rotatably attach the first end 30 of the first panel 22 to the inner sides of the first and second sidewalls 16, 18 of the bed 10 using a full-width axle 114 as shown in FIG. 8, or separate axle stubs on either side of first panel 22. Finally, in regard to the alternative embodiment of the collapsible storage device mentioned above, the first panel 22 of the collapsible storage device 20 may be rotatably secured to the inner walls of the storage bins 108, 110, by means of a full-width axle 112 as shown in FIG. 6, or separate axle stubs on either side of first panel 22.

FIGS. 9 and 10A–10C show another embodiment of a collapsible storage device 250, incorporating aspects of the side storage bins and tracks described above. Storage bins 252, 254 are located on either side of the vehicle bed 10, against the sidewalls 16, 18. Where necessary, the storage bins 252, 254 may have rear panels 256 which conform to the respective wheel wells 258. However, the storage bins are also useable where the wheel wells are situated farther back from the front wall 12, in which case the rear panels 256 need not be shaped to accommodate the wheel well. Each storage bin 252, 254 has an opening 260 for the insertion or removal of articles to or from the bin, and netting 262 to prevent the stored item(s) from falling out of the bin. The collapsible storage device 250 is disposed between the storage bins 252, 254, and may be rotatably mounted to the bins or to the bed front wall 12 by the various means described herein.

One or both of the storage bins 252, 254 may have a track 264 on its inward-facing wall. Like the track described above in reference to FIGS. 7A–7C, the track 264 cooperates with a track follower 266 (see FIGS. 10A–10C) on the collapsible storage device 250 to guide and assist the deployment or folding of the storage device. Desirably, the track 264 is formed so as to be integral with the inward-facing wall(s) of the storage bin(s); however, the track may be simply attached to the wall in a variety of methods known in the art. Preferably, the track 264 is formed of or coated with nylon to permit the track follower to travel smoothly within it. A nylon track also facilitates the use of a track follower which is a simple post, instead of a roller as disclosed previously. Best seen in FIGS. 10A–10C, this track 264 defines a path with a relatively straight, horizontal portion 268 and a relatively straight, vertical portion 270, in contrast with the curved track disclosed above. One advantage of this track configuration is that the horizontal portion 268 can hold the partially-unfolded storage device 250 in the "open" position (see FIG. 10B) while items are placed into or removed from the storage area, as the track follower 266 is less likely to move under the weight of the collapsible storage device 250 when on a horizontal portion of the track.

Figure 10A:
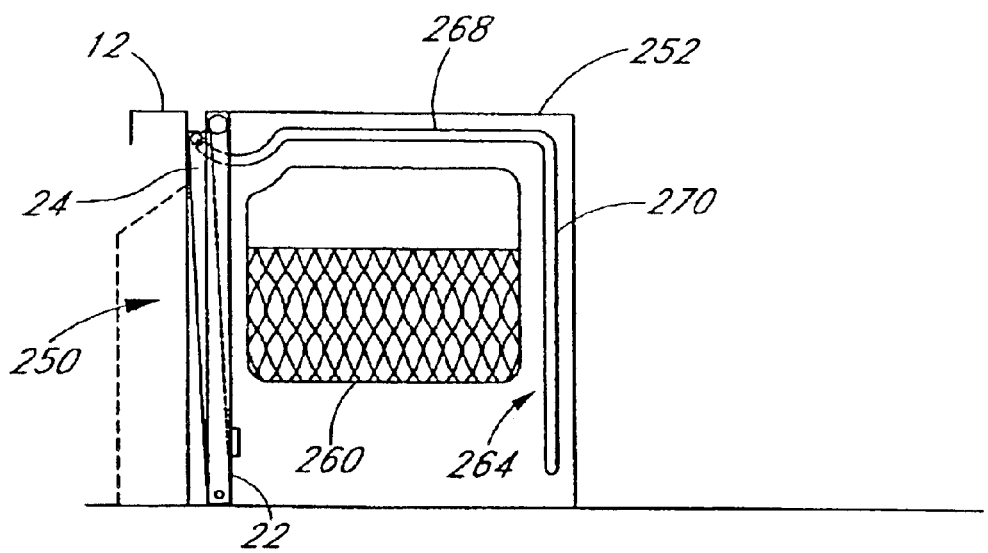
FIGS. 10A–10C are side elevation views of a storage bin and track for use with the embodiment of FIG. 9.
Figure 10B:
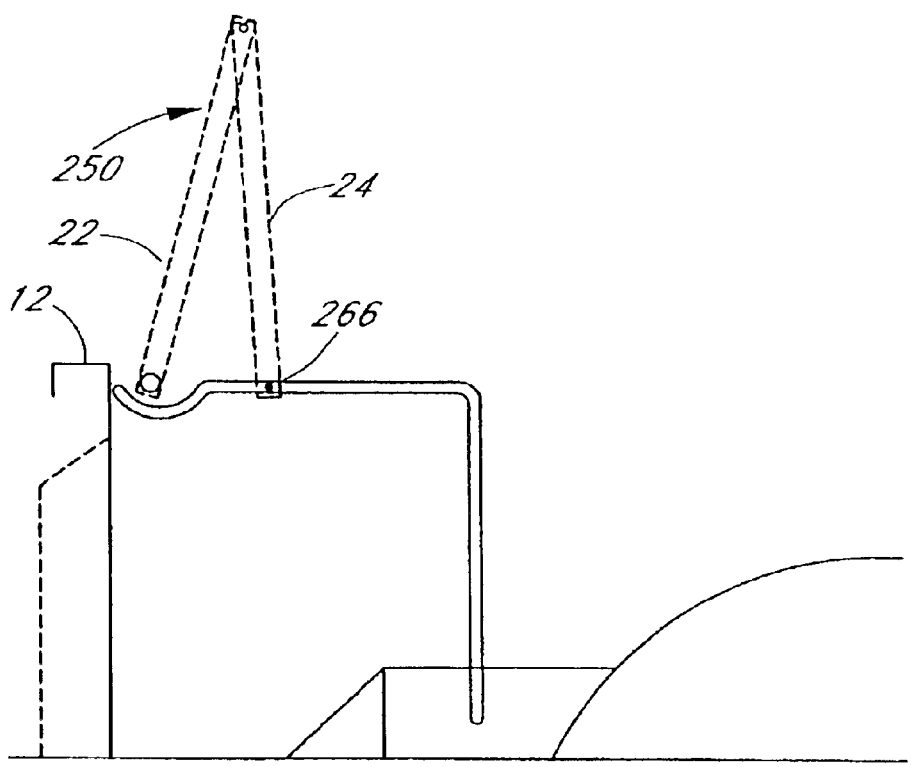
Figure 10C:
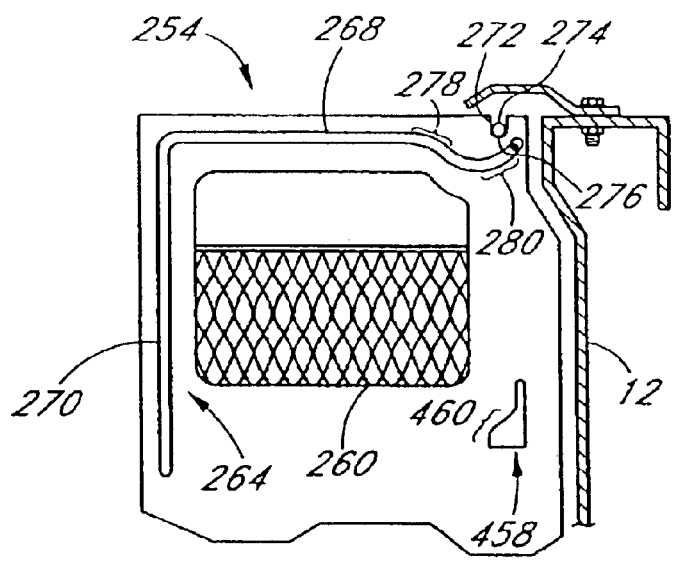

FIG. 10C shows a storage bin 254 without the collapsible storage device panels, so as to better illustrate the track 264 and other aspects of this embodiment of the device. Each storage bin 254 has an integrally formed slot 272 which provides a mounting location for the first panel (not shown), by rotatably receiving an axle portion 274 extending from the first panel. The slot 272 thus defines a pivot point 276 on the axis about which the first panel rotates. To prevent the axle portion 274 from leaving the slot 272 while the device is in use, a cap or other similar retaining member (not shown) can be placed in or over the open top end of the slot 272.

The track 264 may further include a first cam surface 278 and a second cam surface 280 which assist in deployment and storage of the device. When storing the device, the first cam surface 278 directs the track follower 266 downward as it approaches the front wall 12. This causes a corresponding downward movement of the second panel 24, and with it the first panel 22, urged by their own weight. Thus, the first cam surface 278 enables the panels 22, 24 of the device to automatically rotate downward, under their own weight, toward the storage position. The first cam surface 278 and the adjacent curved portion of the track 264 are also shaped to follow the path swept out by the track follower 266 as the panels 22, 24 rotate downward, so as not to inhibit the progress of the panels and further facilitate the automatic movement. This automatic or self-folding aspect substantially enhances the ease of storing the device.

As the panels 22, 24 rotate downward, the track follower 266 then advances into the second cam surface 280, which directs the track follower 266 upward as the device reaches the storage position (see FIG. 10A), with the first panel 22 in a substantially vertical orientation and the second panel 24 mostly nested within the first panel. The protruding track follower(s) 266 prevent the second panel 24 from nesting completely inside the first panel 22; therefore when stored the two panels 22, 24 will form a slight angle with respect to one another. It is desirable to reduce this angle as much as possible so as to minimize the horizontal distance required between the front wall 12 and the pivot point 276. The second cam surface 280 is shaped to accomplish this by bringing the track follower 266 closer to the pivot point 276 as the track follower approaches the endpoint of the track 264. As is readily seen in FIG. 10C, the distance between the pivot point 276 and the centerline of the track 264 decreases as the track reaches its endpoint. This track configuration forces the ends of the panels 22, 24 closer together when in the storage position, minimizing the angle between them and providing better storage of the device. Though this track configuration is disclosed with reference to the embodiment of the storage device shown in FIG. 9, one should note that it is equally useful with the other embodiments described herein.

Also shown in FIG. 10C is a cover flap 282, preferably made of rubber or other flexible, durable material, which attaches to the front wall 12 or other nearby location and covers the space between the front wall 12 and the pivot point 276. Thus positioned, the cover flap 282 helps to seal the junction of the first panel and the front wall 12. This shields the cargo area from rain and the pivot from view, reducing the likelihood of tampering.

Figure 11:
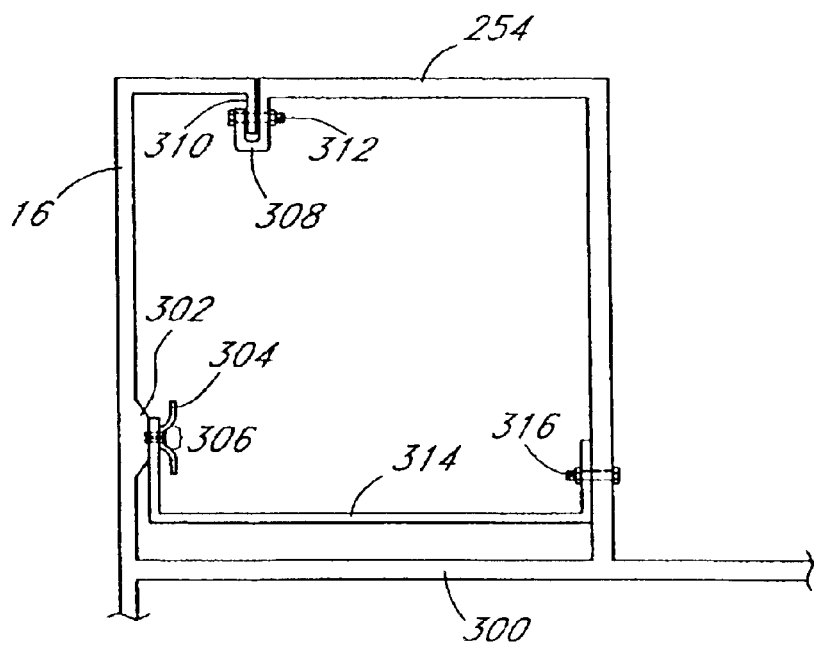
FIG. 11 is a schematic cross-sectional view of the attachment of a storage bin to a vehicle bed sidewall.

FIG. 11 is a schematic cross-sectional depiction of a preferred method of attaching a storage bin 254 to the sidewall 16 of a vehicle bed. In a common vehicle construction, the sidewall 16 joins the bed floor 300 below an existing (i.e., original-equipment) tiedown mount 302 and tiedown cleat 304, which is attached to the tiedown mount via a plurality of screws 306. Along its top inner edge the storage bin 254 forms a C-shaped lip 308 which is adapted to receive an inner flange 310 on the top portion of the sidewall 16, when the lower edge of the storage bin 254 contacts the bed floor 300. One or more bolts 312 or other suitable fasteners securely join the lip 308 and flange 310. Alternatively, a separate C-clamp can be used to reduce manufacturing costs of the storage bins. A bracket 314, preferably made of steel or other high-strength material, is adapted to attach to the tiedown mount 302 underneath the tiedown cleat 304, via the existing screws 306. The bracket 314 extends to the opposite side of the storage bin 254 and attaches to it with one or more bolts 316 or other suitable fasteners.

FIGS. 12A–12D depict an alternative design for first and second panels 22, 24 which are suited for use with that version of the collapsible storage device disclosed above with regard to FIGS. 9 and 10A–10C. Each panel 22, 24 consists of a frame 402, 404 which receives a cover 406, 408 in a recess 410, 412. The frames 402, 404 and covers 406, 408 are preferably made of a molded heavy-duty plastic such as ABS or PVC. Most preferably they are injection molded, but they may alternatively be blow molded or composed of structural foam.

Figure 12A:
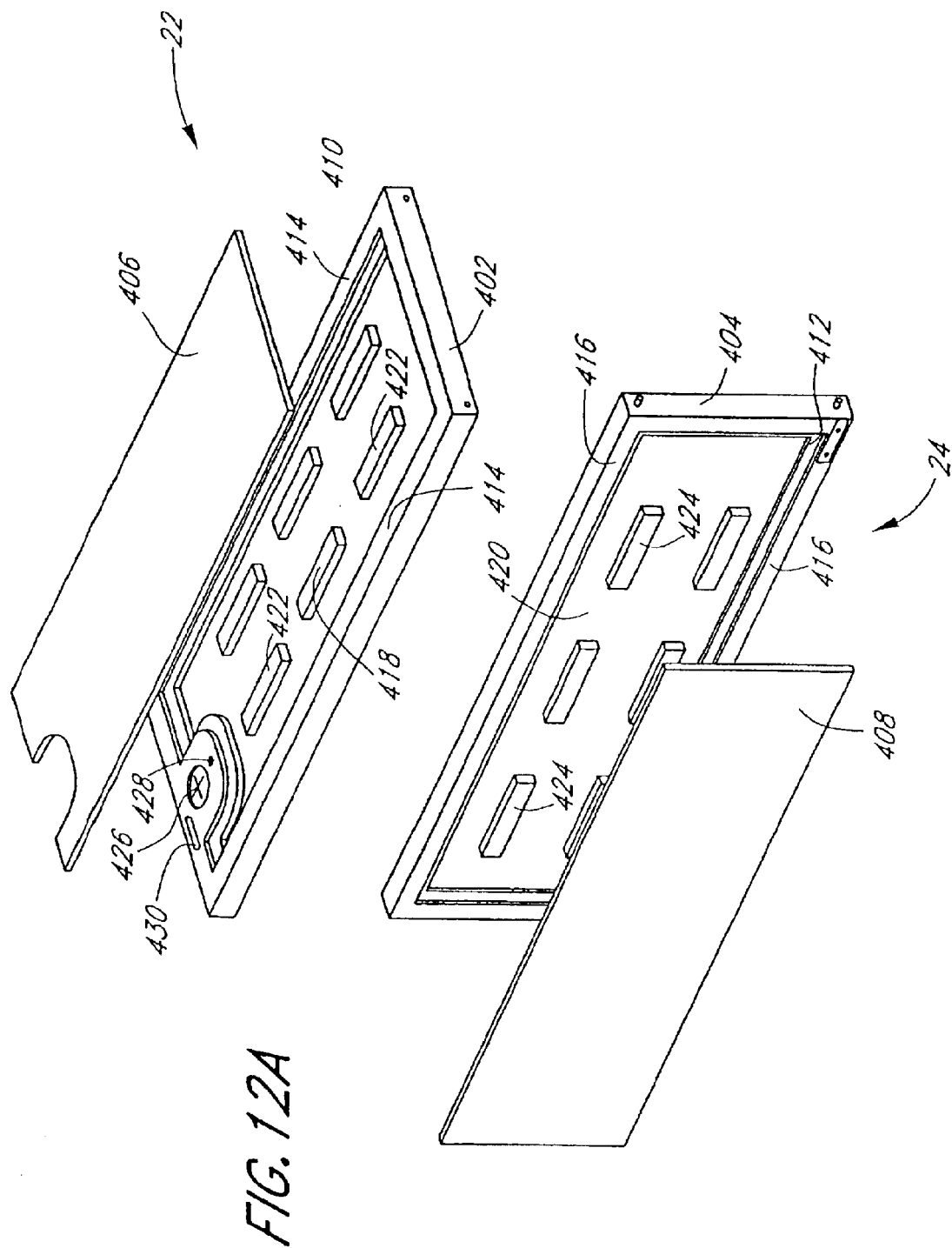
Figure 12B:
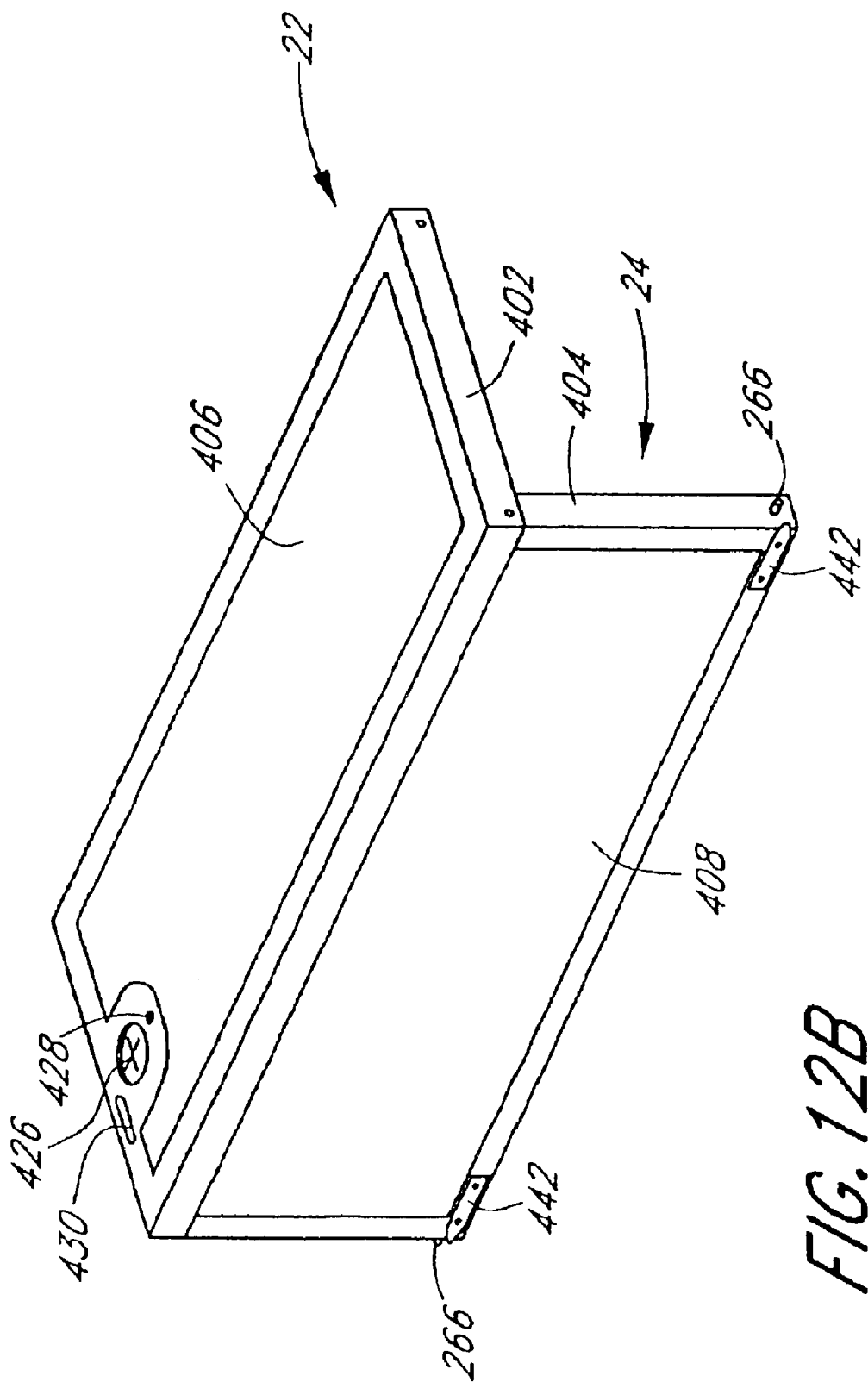
Figure 12D:
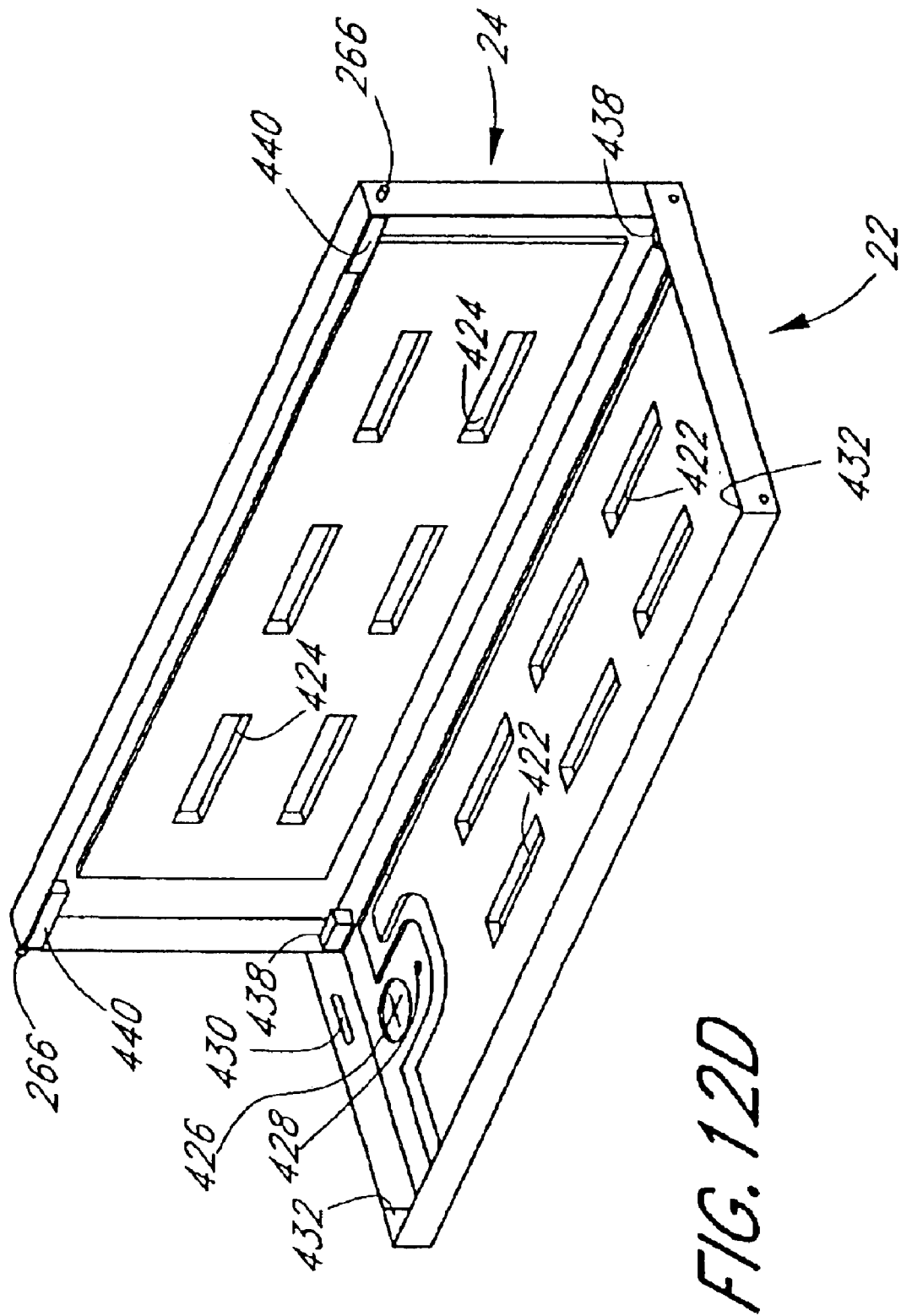

Each frame 402, 404 is molded so as to form a perimeter channel 414, 416 which incorporates the recess 410, 412 midway along its width. The perimeter channel 414, 416 and the recess 410, 412 greatly stiffen the frame 402, 404 without adding significant weight by increasing the profile of the frame 402, 404 in a manner similar to the flanges of an I-beam. Each perimeter channel 414, 416 surrounds a center plane 418, 420 having a number of integrally molded raised portions 422, 424. The raised portions provide added stiffness as well as intermediate areas of contact for the cover 406, 408 when it is bonded to the frame 402, 404 (as seen in FIG. 12B). The cover 406, 408 is securely bonded to the frame 402, 404 by adhesives or other methods known to those skilled in the art, and provides additional stiffening to the panels 22, 24 without a great increase in weight.

Referring again to FIG. 12A, the first panel 22 may also feature a latch cutout 426 and a lock cutout 428, as well as a side cutout 430. These cutouts provide space for the location and function of the lock and latch, which will be described in more detail below.

FIG. 12C shows the underside of the panels 22, 24 as well as the hardware used for joining and reinforcing the panels. The first panel 22 includes a reinforcement bracket 432 at each corner, with holes 434 in the brackets 432 at the hinged end of the first panel. These holes 434 receive pins 436 formed by pin blocks 438 at each corner on the hinged end of the second panel 24. At the opposite end of the second panel 24 are track follower blocks 440 to which are attached track follower plates 442 (see FIG. 12B) on the opposite face of the second panel 24. Each track follower plate 442 forms a track follower 266 extending laterally from the panel on either side.

FIG. 13 shows schematically the latch 444 and lock 446 in the first panel 22. The latch consists of a handle 448 rotatably received in the first panel 22, and a rod 450 attached to the handle so that rotation of the handle within the panel will cause the rod to rotate correspondingly. The rod 450 has a closed position 452 where it extends beyond the perimeter of the first panel 22, and an open position 454 where it is wholly within the perimeter. In the closed position 452 the rod 450 may engage or be received by a stop (see FIG. 1) so as to prevent movement of the collapsible storage device from its present (collapsed or deployed) position. The side cutout 430 (see FIGS. 12A–12D) in the first panel 22 permits the rod to move between the closed and the open positions 452, 454. Desirably, the range of rotation of the latch 444 may be limited to about 90° or less.

The lock 446 is situated adjacent the latch 444 and is operable by a key, by the input of a combination of numbers, letters, etc., or otherwise to selectively impede the rotation of the latch by movement of a blocking member 456. Thus the lock 446, when engaged, will prevent operation of the latch 444 to collapse or deploy the collapsible storage device.

Figure 14:
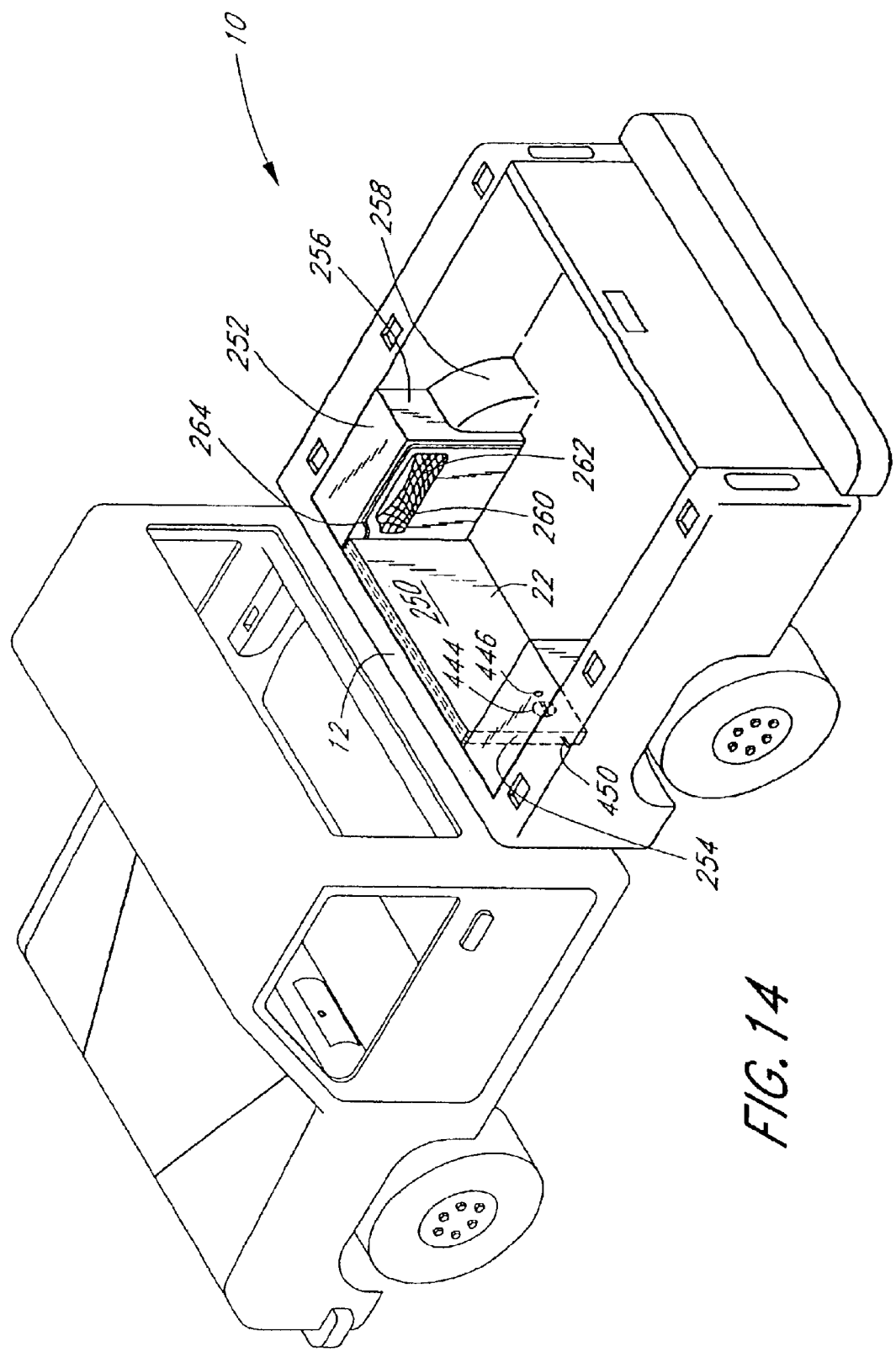
FIG. 14 is a perspective view of the collapsible storage device employing the lock of FIG. 13.

FIG. 14 shows the collapsible storage device 250 situated in a vehicle bed 10 with the latch 444 and lock 446 retaining the device 250 in the collapsed position. The latch 444 has been rotated so that the rod 450 extends beyond the perimeter of the first panel 22 and engages a stop 458 (see FIG. 10C) cut into the side of the storage bin 254. The stop 458 may have a cam surface 460, which is curved so as to direct the collapsible storage device toward the front wall 12 as the rod 450 and latch 444 are rotated as shown in FIG. 13. Thus, the only user effort required to move the device to the fully collapsed position is rotation of the latch 444. The user may then operate the lock 446 to prevent unauthorized use of the device. Other structure suitable to engage the rod 450 along the top edge of either or both storage bins 252, 254 would facilitate locking in the deployed position. The lock 446 may be any suitable commercially available lock, such as Model No. 01-43-21 available from the South Company.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof Thus, it is intended that the scope of the present invention herein disclosed should not be limited by the particular disclosed embodiments described above, but should be determined only by a fair reading of the claims that follow.

What is claimed is:

1. A collapsible storage box for use in a vehicle bed having a front wall and first and second sidewalls, said storage box comprising:
    a first panel having a front edge connectable with respect to said front wall so as to be rotatable about a generally horizontal first axis, and a rear edge opposite said front edge;
    a second panel having a front edge rotatably connected to said rear edge of said first panel;
    said panels configured to be movable between a storage position and a deployed position in which said panels cooperate with said front wall and said sidewalls to form an enclosure in said vehicle bed; and
    a track configured to guide movement of said panels between said storage position and said deployed position, said track mountable in said vehicle bed to extend generally rearward from said front wall, with a generally horizontal upper track portion and an inclined track portion extending forward and downward from said horizontal upper track portion.

2. The storage box of claim 1, further comprising a track follower connected to said second panel and configured to engage said track;
    said inclined track portion guiding said track follower downward as said track follower moves forward from said horizontal upper track portion, thereby permitting a simultaneous downward angular displacement of said panels.

3. The storage box of claim 1, further comprising a track follower connected to said second panel and configured to engage said track;
    wherein said track further comprises a forward track portion located forward of said inclined track portion, said forward track portion directing said track follower upward and closer to said first axis as said track follower is moved forward, thereby reducing an included angle formed by said first panel and said second panel.

4. The storage box of claim 1, wherein said first panel forms a top portion of said enclosure and said second panel forms a rear portion of said enclosure, when said panels are in said deployed position.

5. The storage box of claim 1, wherein said panels are oriented generally vertically and said front edge of said first panel is located above said rear edge of said first panel, when said panels are in said storage position.

6. The storage box of claim 1, wherein said panels are folded against each other when in said storage position.

7. A collapsible storage box for use in a vehicle bed having a front wall and first and second sidewalls, said storage box comprising:
    a first panel having a front edge rotatably connectable with respect to said front wall, and a rear edge opposite said front edge;
    a second panel having a front edge rotatably connected to said rear edge of said first panel;
    said panels configured to be movable between a storage position and a deployed position in which said panels cooperate with said front wall and said sidewalls to form an enclosure in said vehicle bed; and
    a track configured to guide movement of said panels between said storage position and said deployed position, said track mountable in said vehicle bed to extend generally rearward from said front wall, with a front portion of said track located upward from a rear portion of said track.

8. The storage box of claim 7, wherein said front portion of said track comprises a generally horizontal track portion.

9. The storage box of claim 8, wherein said rear portion of said track comprises a generally vertical track portion.

10. The storage box of claim 7, wherein said first panel forms a top portion of said enclosure and said second panel forms a rear portion of said enclosure, when said panels are in said deployed position.

11. The storage box of claim 7, wherein said panels are oriented generally vertically and said front edge of said first panel is located above said rear edge of said first panel, when said panels are in said storage position.

12. The storage box of claim 7, wherein said panels are folded against each other when in said storage position.

13. The storage box of claim 8, wherein said front portion of said track further comprises an inclined track portion extending forward and downward from said horizontal track portion.

14. The storage box of claim 7, further comprising a track follower connected to said second panel and configured to engage said track.

15. A collapsible storage box for use in a vehicle bed having a front wall and first and second sidewalls, said storage box comprising:
    a first panel having a front edge connectable with respect to said front wall so as to be rotatable about a generally horizontal first axis, and a rear edge opposite said front edge;
    a second panel having a front edge rotatably connected to said rear edge of said first panel, and a rear edge opposite said front edge;
    said panels configured to be movable between a storage position in which said panels are oriented generally vertically and said first panel extends generally downward from said first axis, and a deployed position in which said panels cooperate with said front wall and said sidewalls to form an enclosure in said vehicle bed; and a track configured to guide movement of said panels between said storage position and said deployed position, said track mountable in said vehicle bed to form a generally horizontal track portion extending generally rearward from said front wall;

wherein said generally horizontal track portion is configured to hold said panels in an open position in which said rear edge of said second panel is spaced above said vehicle bed.

16. The storage box of claim 15, wherein said first panel forms a top portion of said enclosure and said second panel forms a rear portion of said enclosure, when said panels are in said deployed position.

17. The storage box of claim 15, wherein said panels are oriented generally vertically and said front edge of said first panel is located above said rear edge of said first panel, when said panels are in said storage position.

18. The storage box of claim 15, wherein said panels are folded against each other when in said storage position.

19. The storage box of claim 15, wherein said track further comprises a generally vertical track portion located rearward of said generally horizontal track portion.

20. The storage box of claim 15, wherein said track further comprises an inclined track portion extending forward and downward from said horizontal track portion.

21. The storage box of claim 15, further comprising a track follower connected to said second panel and configured to engage said track.

22. A collapsible storage box for use in a vehicle bed having a front wall and first and second sidewalls, said storage box comprising:

a first panel having a front edge connectable with respect to said front wall so as to be rotatable about a generally horizontal first axis, and a rear edge opposite said front edge;

a second panel having a front edge rotatably connected to said rear edge of said first panel;

said panels configured to be movable between a storage position and a deployed position in which said panels cooperate with said front wall and said sidewalls to form an enclosure in said vehicle bed;

a track configured to guide movement of said panels between said storage position and said deployed position; and a track follower connected to said second panel and configured to engage said track;

said track being mountable in said vehicle bed to extend generally rearward from said front wall, with a forward track portion extending forward of said first axis, said forward track portion directing said track follower upward and closer to said first axis as said track follower is moved forward and said panels approach said storage position, thereby reducing an included angle formed by said first panel and said second panel when they are in said storage position.

23. The storage box of claim 22, wherein said first panel forms a top portion of said enclosure and said second panel forms a rear portion of said enclosure, when said panels are in said deployed position.

24. The storage box of claim 22, wherein said panels are oriented generally vertically and said front edge of said first panel is located above said rear edge of said first panel, when said panels are in said storage position.

25. The storage box of claim 22, wherein said panels are folded against each other when in said storage position.

* * * * *